United States Patent
Saitou et al.

(10) Patent No.: US 12,278,525 B2
(45) Date of Patent: Apr. 15, 2025

(54) DRIVE DEVICE

(71) Applicant: DENSO CORPORATION, Kariya (JP)

(72) Inventors: Atsushi Saitou, Kariya (JP); Tomoaki Yoshimi, Kariya (JP)

(73) Assignee: DENSO CORPORATION, Kariya (JP)

( * ) Notice: Subject to any disclaimer, the term of this patent is extended or adjusted under 35 U.S.C. 154(b) by 330 days.

(21) Appl. No.: 17/818,865

(22) Filed: Aug. 10, 2022

(65) Prior Publication Data

US 2022/0385144 A1   Dec. 1, 2022

Related U.S. Application Data

(63) Continuation of application No. PCT/JP2021/004512, filed on Feb. 8, 2021.

(30) Foreign Application Priority Data

Feb. 14, 2020  (JP) ................. 2020-023305

(51) Int. Cl.
   *H02K 11/30* (2016.01)
   *H02K 5/22* (2006.01)
(52) U.S. Cl.
   CPC ............. *H02K 11/30* (2016.01); *H02K 5/225* (2013.01)
(58) Field of Classification Search
   CPC ................................ H02K 11/30; H02K 5/225
   See application file for complete search history.

(56) References Cited

U.S. PATENT DOCUMENTS

| | | | |
|---|---|---|---|
| 11,888,345 B2 * | 1/2024 | Yamasaki | H02K 11/33 |
| 11,932,324 B2 * | 3/2024 | Kanno | B62D 5/046 |
| 2018/0006521 A1 * | 1/2018 | Fujimoto | H02K 5/225 |
| 2018/0093698 A1 * | 4/2018 | Urimoto | H02K 15/0062 |
| 2019/0150269 A1 * | 5/2019 | Klenk | B62D 5/0403 |
| | | | 310/68 R |
| 2021/0013770 A1 * | 1/2021 | Yamasaki | H01R 13/50 |
| 2022/0385144 A1 * | 12/2022 | Saitou | H02K 11/30 |
| 2024/0006954 A1 * | 1/2024 | Matsuo | H02K 5/225 |
| 2024/0088758 A1 * | 3/2024 | Yoshimi | B62D 5/04 |

FOREIGN PATENT DOCUMENTS

| | | | | |
|---|---|---|---|---|
| JP | 2010-028925 A | | 2/2010 | |
| JP | 7122180 B2 * | | 8/2022 | ........... B62D 5/0403 |

* cited by examiner

Primary Examiner — Robert W Horn
(74) Attorney, Agent, or Firm — Maschoff Brennan

(57) ABSTRACT

A drive device includes an electric motor and a control unit which are integrated together. The control unit is configured to control the electric motor by using an electric power supply and a signal supplied through an external cable. The control unit includes: a parent circuit board, which is installed to the electric motor; and a connector module, which is configured to connect the parent circuit board to an external connector of the external cable. The connector module includes: a connector portion that is configured to be coupled with and decoupled from the external connector; a wiring module that is configured to receive the electric power supply and the signal from the external cable through the connector portion; and a plurality of connecting conductors that electrically connect the wiring module to the parent circuit board.

19 Claims, 23 Drawing Sheets

DRIVE DEVICE

CROSS REFERENCE TO RELATED APPLICATIONS

This application is a continuation application of International Patent Application No. PCT/JP2021/004512 filed on Feb. 8, 2021, which designated the U.S. and claims the benefit of priority from Japanese Patent Application No. 2020-023305 filed on Feb. 14, 2020. The entire disclosures of all of the above applications are incorporated herein by reference.

TECHNICAL FIELD

The present disclosure relates to a drive device.

BACKGROUND

Previously, there has been proposed a drive device that includes an electric motor and a control device which are integrated together, and the control device is configured to control the electric motor. For example, there has been proposed a drive device for an electric power steering device. In this drive device, a connector portion, which is configured to connect with a connector (an external connector) of an external cable, is formed integrally with a housing made of resin. A wiring circuit board is assembled to the housing, and an inverter circuit and a CPU for controlling the electric motor are installed on the wiring circuit board. Thereby, the electric motor and the control device are integrated together.

SUMMARY

This section provides a general summary of the disclosure, and is not a comprehensive disclosure of its full scope or all of its features.

According to the present disclosure, there is provided a drive device including an electric motor and a control unit which are integrated together, wherein:
the control unit is configured to control the electric motor by using an electric power supply and a signal supplied through an external cable;
the control unit includes:
a parent circuit board, which is installed to the electric motor; and
a connector module, which is configured to connect the parent circuit board to an external connector of the external cable; and
the connector module includes:
a connector portion, which is configured to be coupled with and decoupled from the external connector;
a wiring module, which is configured to receive the electric power supply and the signal from the external cable through the connector portion; and
a plurality of connecting conductors, which electrically connect the wiring module to the parent circuit board.

According to another aspect of the present disclosure, there is provided a drive device including a multi-phase alternating current motor and a control unit which are integrated together, wherein:
the multi-phase AC motor includes a plurality of sets of windings, and the control unit includes a plurality of inverters, which individually control an electric current conducted through a corresponding one of the plurality of sets of windings;
the control unit includes:
a parent circuit board, which is installed to the multi-phase AC motor; and
a connector module, which is configured to connect the parent circuit board to a plurality of external connectors of an external cable for a plurality of systems; and
the connector module includes:
a plurality of connector portions, which are configured to be coupled with and decoupled from the plurality of external connectors, respectively;
a wiring module, which is configured to receive an electric power supply and a signal from the external cable through the plurality of connector portions;
a plurality of connecting conductors, which electrically connect the wiring module to the parent circuit board; and
a single lock member, which is configured to collectively lock or release the plurality of external connectors relative the plurality of connector portions, respectively.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
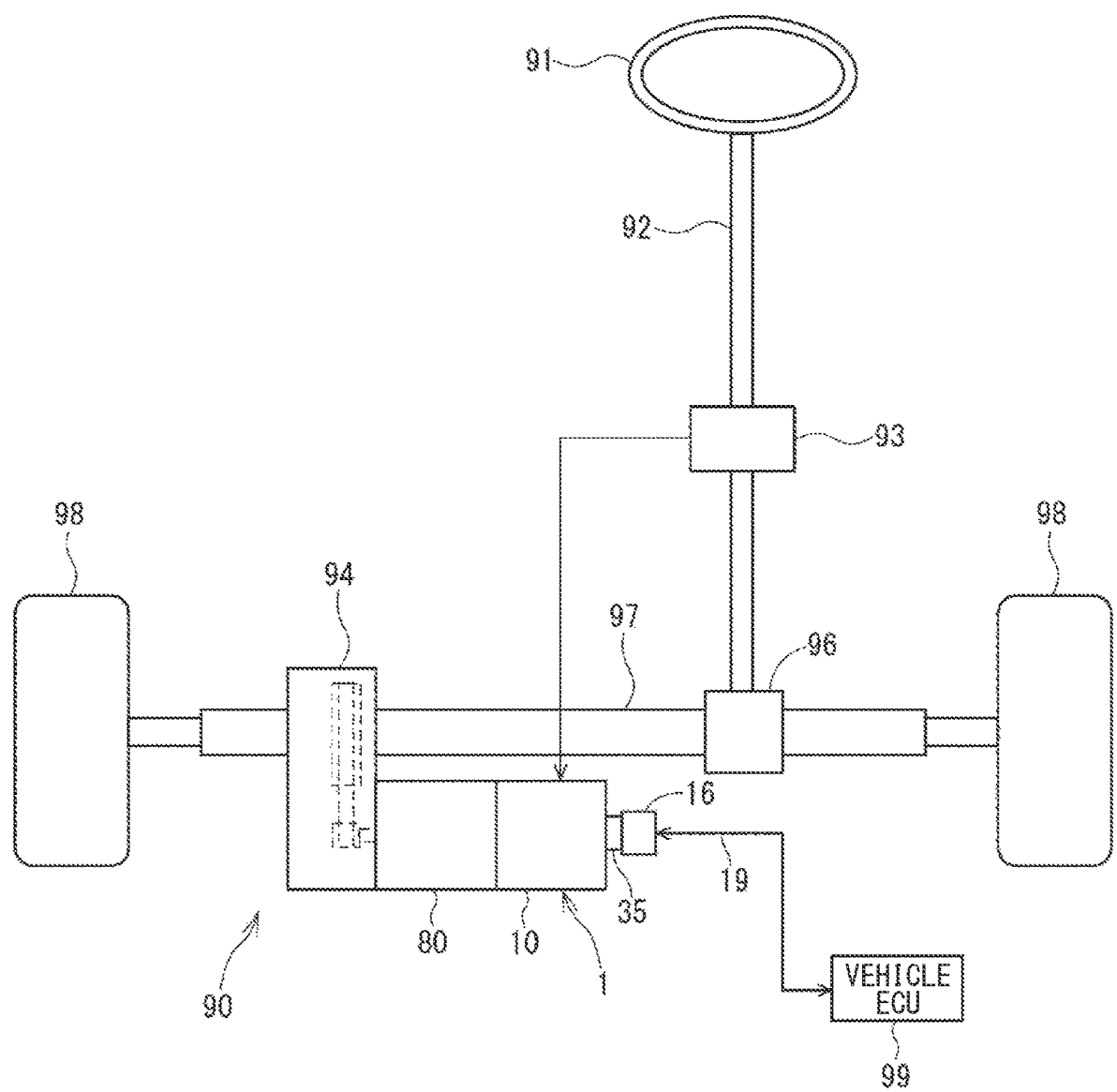
FIG. 1 is an overall view of an electric power steering system showing an example where a drive device is applied.

Previously, there has been proposed a drive device that includes an electric motor and a control device which are integrated together, and the control device is configured to control the electric motor. For example, there has been proposed a drive device for an electric power steering device. In this drive device, a connector portion, which is configured to connect with a connector (an external connector) of an external cable, is formed integrally with a housing made of resin. A wiring circuit board is assembled to the housing, and an inverter circuit and a CPU for controlling the electric motor are installed on the wiring circuit board. Thereby, the electric motor and the control device are integrated together.

However, according to the previously proposed drive device, the connector portion is designed with a dedicated size for a specific type of external connector. Therefore, in a case where specifications of an external device, such as a battery, a sensor, is changed, or a case where a different type of external connector having the size, which varies among the OEMs, is specified, it is difficult to easily change the connector portion of the drive device in conformity with such an external connector. Occasionally, a change in the design of the control circuit board is needed due to a change in the size of the external connector.

According to a first aspect of the present disclosure, there is provided a drive device that includes an electric motor and a control unit which are integrated together. The control unit is configured to control the electric motor by using an electric power supply and a signal supplied through an external cable. The control unit includes: a parent circuit board, which is installed to the electric motor; and a connector module, which is configured to connect the parent circuit board to an external connector of the external cable. The connector module includes: a connector portion, which is configured to be coupled with and decoupled from the external connector; a wiring module, which is configured to receive the electric power supply and the signal from the external cable through the connector portion; and a plurality of connecting conductors, which electrically connect the wiring module to the parent circuit board.

According to a second aspect of the present disclosure, there is provided a drive device that includes: a multi-phase alternating current (AC) motor and a control unit which are integrated together. The multi-phase AC motor includes a plurality of sets of windings, and the control unit includes a plurality of inverters, which individually control an electric current conducted through a corresponding one of the plurality of sets of windings. The control unit includes: a parent circuit board, which is installed to the multi-phase AC motor; and a connector module, which is configured to connect the parent circuit board to a plurality of external connectors of an external cable for a plurality of systems. The connector module includes: a plurality of connector portions, which are configured to be coupled with and decoupled from the plurality of external connectors, respectively; a wiring module, which is configured to receive an electric power supply and a signal from the external cable through the plurality of connector portions; a plurality of connecting conductors, which electrically connect the wiring module to the parent circuit board; and a single lock member, which is configured to collectively lock or release the plurality of external connectors relative to the plurality of connector portions, respectively.

According to the drive device of the present disclosure, the electric power supply and the signal from the external connector(s) are supplied to the parent circuit board through the connector portion(s), the wiring module and the plurality of connecting conductors. Therefore, in a case where the size or the type of the external connector(s) is changed, it is possible to easily deal with the specifications of the external connector(s) by changing a portion of the connector module without changing the parent circuit board of the electric motor.

Hereinafter, a plurality of embodiments, in which the present disclosure is applied as a drive device of an electric power steering system for a vehicle, will be described with reference to the drawings. In each of the embodiments, the same or similar components are indicated by the same reference sign in the drawings, and redundant description thereof will be omitted. First, a schematic structure of the electric power steering system will be described as a structure common to each embodiment. The electric power steering system 90 shown in FIG. 1 is configured as a rack assist electric power steering system that outputs the steering assist torque. However, the drive device of the present disclosure can be equally applied as a column assist electric power steering system.

The electric power steering system 90 for the vehicle includes a steering wheel 91, a steering shaft 92, a pinion gear 96, a rack shaft 97 and wheels 98. The steering wheel 91 is connected to the steering shaft 92. The steering shaft 92 is coupled to the rack shaft 97 through the pinion gear 96. When a driver of the vehicle rotates the steering wheel 91, the steering shaft 92 is rotated. The rotation of the steering shaft 92 is converted into a linear motion of the rack shaft 97 through the pinion gear 96, and the wheels 98 are steered to an angle that corresponds to the amount of displacement of the rack shaft 97.

The electric power steering system 90 includes a steering torque sensor 93, a control unit 10, an electric motor 80 and a speed reducer 94. The steering torque sensor 93 is installed to the middle of the steering shaft 92 and senses the steering torque of the driver at the middle of the steering shaft 92. In a case where the control of the electric motor 80 is not made redundant (the first embodiment described later), a measurement value of one steering torque sensor 93 is supplied to the control unit 10 of the drive device 1. In another case where the control of the electric motor 80 is made redundant (the second embodiment described later), measurement values of two steering torque sensors 93 are supplied to the control unit 10.

Figure 2:
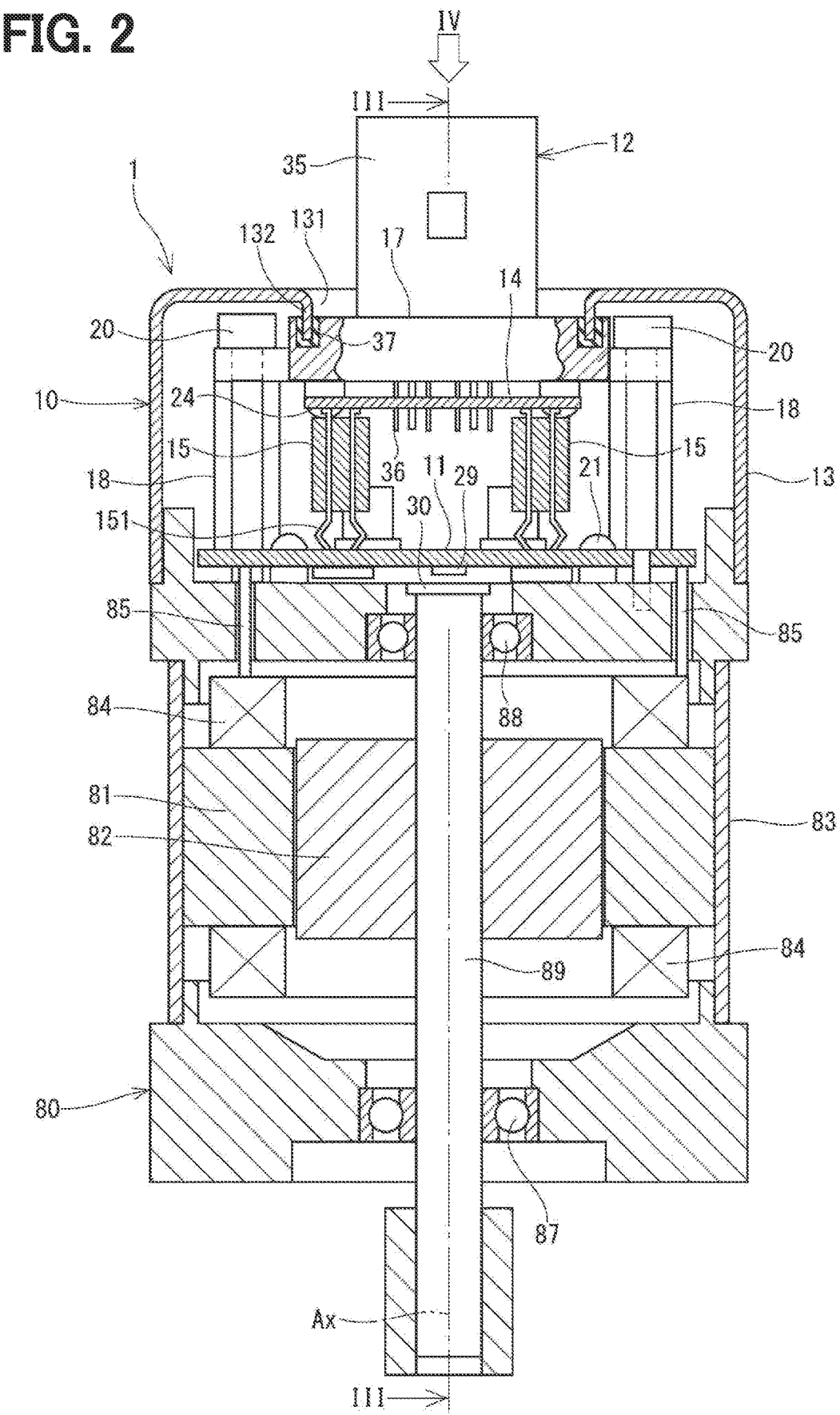
FIG. 2 is a longitudinal cross-sectional view of a drive device of a first embodiment.

The control unit 10 obtains the steering torque, which is sensed by the steering torque sensor 93, and an electric angle of the electric motor 80, which is sensed by a rotational angle sensor 29 (see FIG. 2). The control unit 10 controls the operation of the electric motor 80 such that the electric motor 80 generates a desired assist torque based on the information of the steering torque and the electric angle of the electric motor 80 obtained above and the information of a motor current value, which is sensed by the control unit 10. The assist torque, which is outputted from the electric motor 80, is transmitted to the rack shaft 97 through the speed reducer 94. Furthermore, the control unit 10 is connected to an external device, such as a vehicle electronic control unit (ECU) 99, through an external cable 19. The vehicle ECU 99 controls various mechanisms or devices, such as the engine, a brake, a suspension which are involved in the running of the vehicle.

The control unit 10 is installed to one side of the electric motor 80 in an axial direction. The electric motor 80 and the control unit 10 form the drive device 1 of a mechanical and electrical integrated type. In the case of FIG. 1, the control unit 10 is located on an opposite side of the electric motor 80, which is opposite to an output side of the electric motor 80, such that the control unit 10 is coaxial with the electric motor 80. In another case, the control unit 10 may be located on the output side of the electric motor 80 such that the control unit 10 is coaxial with the electric motor 80.

Figure 3:
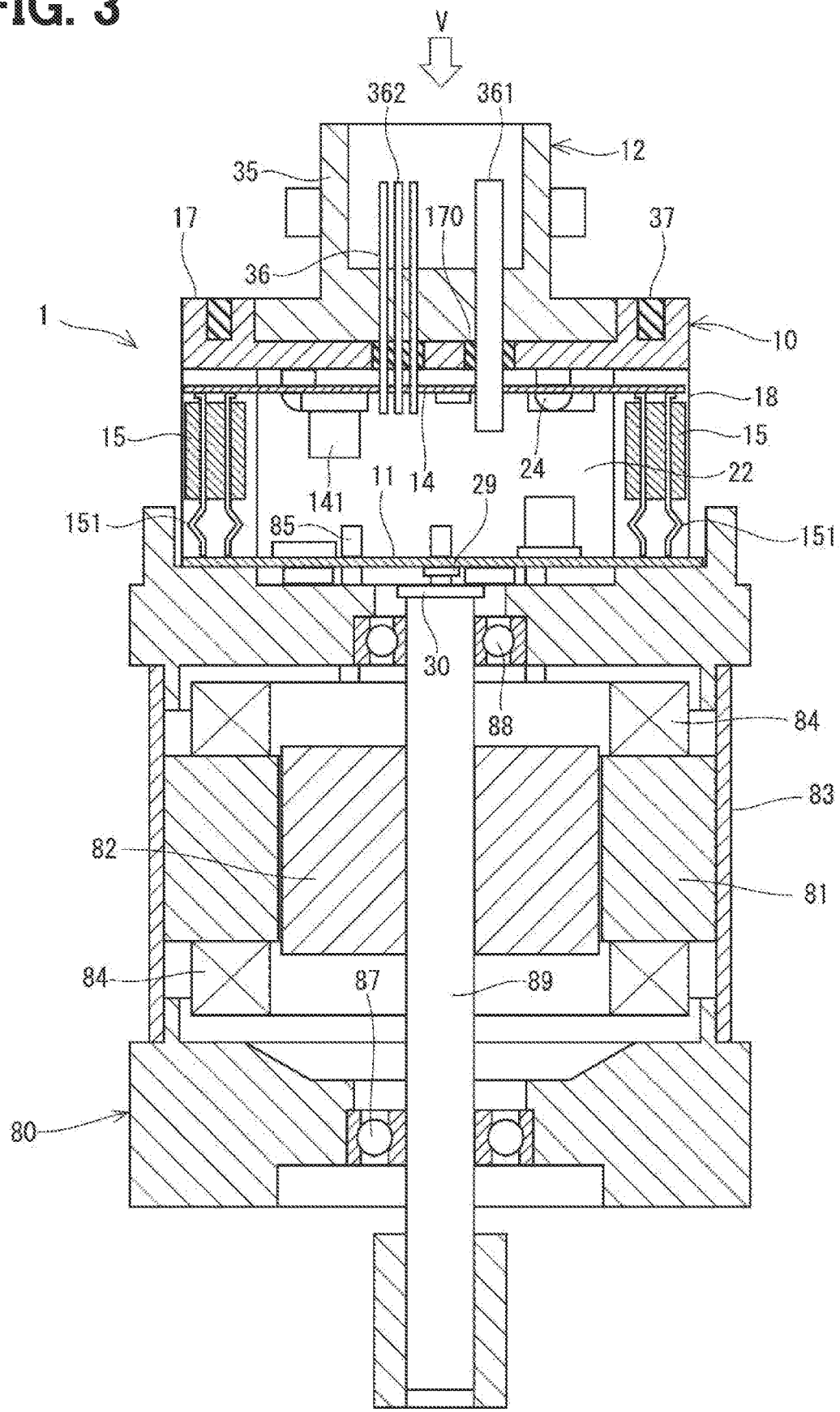
FIG. 3 is a cross-sectional view taken along line III-III in FIG. 2, showing the drive device from which a cover is removed.
Figure 4:
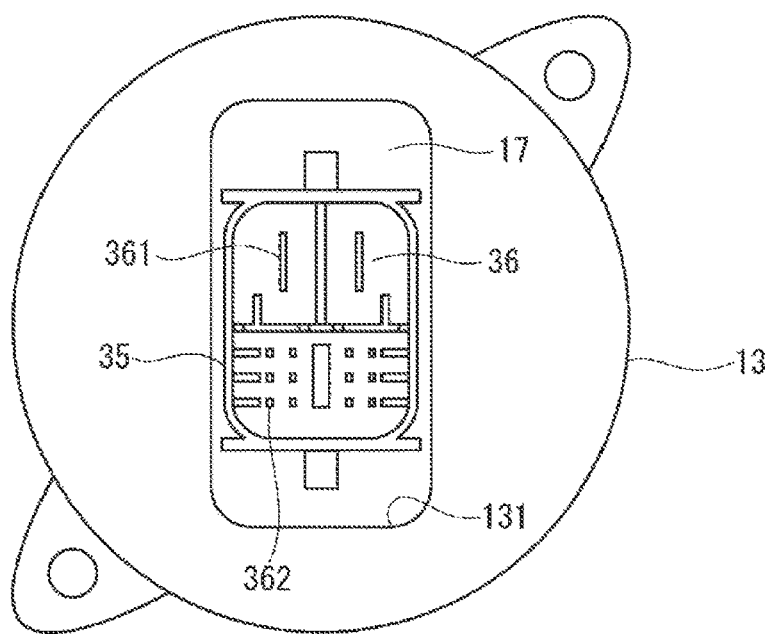
FIG. 4 is a view taken in a direction of an arrow IV in FIG. 2.
Figure 5:
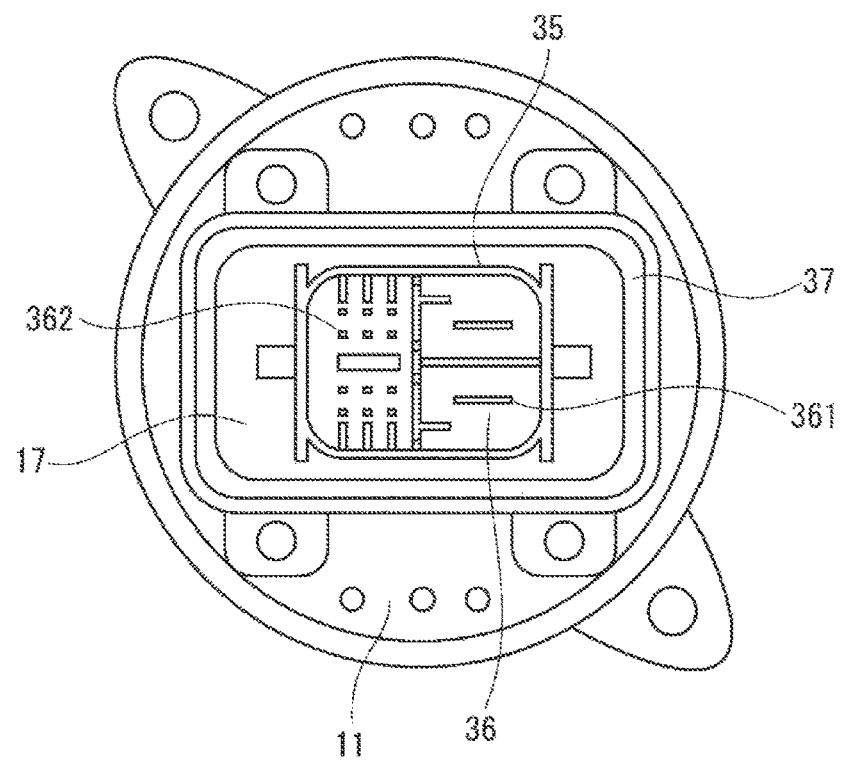
FIG. 5 is a view taken in a direction of an arrow V in FIG. 3.

As shown in FIGS. 2 and 3, the electric motor 80 is a multi-phase alternating current (AC) motor, more specifically, a three-phase AC brushless motor and includes a stator 81, a rotor 82 and a motor housing 83 while the motor housing 83 receives the stator 81 and the rotor 82. The stator 81 is fixed to the motor housing 83, and one or two sets of three-phase windings 84 are wound around the stator 81 such that lead wires 85 extend from the windings 84 of each phase. The rotor 82 is located on an inner side of the stator 81 and is rotatably supported by the motor shaft 89 relative to the motor housing 83 through bearings 87, 88. A permanent magnet 30 is installed to the motor shaft 89 at a location that is opposed to the rotational angle sensor 29.

First Embodiment

Next, the drive device 1 of the first embodiment will be described with reference to FIGS. 2 to 5. As described above, the drive device 1 includes the electric motor 80 and the control unit 10 which are integrated together. The control unit 10 controls the electric motor 80 by using an electric power supply and signals of a single system supplied from the external cable 19 (see FIG. 1). The control unit 10 includes a parent circuit board 11 and a connector module 12. The connector module 12 connects the parent circuit board 11 to an external connector 16 (see FIG. 1) of the external cable 19. In the following description, the output side (the lower side of FIG. 2) of the electric motor 80 will be referred to as a front side, and the opposite side (the upper side of FIG. 2), which is opposite to the front side, will be referred to as a rear side.

As shown in FIGS. 2 and 3, the parent circuit board 11 is fixed to the rear side surface of the motor housing 83 by fixation screws 21 and is connected to three lead wires 85 of the single system which extend from the electric motor 80. Various electronic components, such an inverter for controlling energization of the electric motor 80, a microcomputer for outputting a drive signal to the inverter, are installed to the front side surface and the rear side surface of the parent circuit board 11. Here, it should be noted that FIGS. 13A, 13B and 14 of the second embodiment show an arrangement of the components of two systems on the parent circuit board 11 of the second embodiment. However, the electronic components, which are the same types of electronic components as the electronic components on the parent circuit board 11 of the second embodiment, may be arranged on the parent circuit board 11 of the first embodiment.

The connector module 12 has a base portion 17, a connector portion 35, a child circuit board 14, a plurality of connecting conductors 15 and a plurality of spacer members 18. The base portion 17 is installed to the electric motor 80 by a plurality of assembly bolts 20 (see FIG. 2). The connector portion 35 is installed to the base portion 17 (see FIG. 3), and the external connector 16 is configured to be coupled with and decoupled from the connector portion 35 in an axial direction of an axis (hereinafter, also referred to as a motor axis) AX of the electric motor 80. The child circuit board 14 is a wiring module that receives the electric power supply and the signals from the external cable 19 through the connector portion 35, and the child circuit board 14 is arranged to overlap with the parent circuit board 11 in the axial direction of the motor axis AX. Furthermore, the child circuit board 14 is located at a position that is closer to the connector portion 35 than the parent circuit board 11 in the axial direction. In other words, the child circuit board 14 is axially located on a side of the parent circuit board 11 where the connector portion 35 is placed.

The child circuit board 14 is located on an opposite side of the base portion 17, which is opposite to the connector portion 35, such that the child circuit board 14 is placed adjacent to the base portion 17. The child circuit board 14 is fixed to a plurality of pins 24 (see FIG. 3) which project from the base portion 17 made of resin by thermally swaging (i.e., plastically deforming upon application of heat) tips of the pins 24 against the child circuit board 14. The child circuit board 14 is a single-sided reflow circuit board (i.e., a reflow circuit board that is single sided) that has a plurality of circuit elements 141 (FIG. 3 indicates representative elements among the plurality of circuit elements 141) installed only on the front side surface of the circuit board which is opposed to the electric motor 80. Electronic circuits on the child circuit board 14 include, for example, a filter circuit, which removes a noise conducted through the external cable 19, a communication circuit, which communicates with an external device through the external cable 19 and a calculation circuit, which calculates an electric current command value of the electric current supplied to the electric motor 80 based on the communication.

A plurality of terminals 36, which electrically connect the external connector 16 to the child circuit board 14, are installed in the connector portion 35. The terminals 36 include a plurality of electric power supply terminals 361 for receiving the electric power supply from the external cable 19, and a plurality of signal terminals 362 for receiving the signals from the external cable 19. Each of the terminals 36 is shaped in a straight linear form that extends linearly in parallel with the motor axis Ax. Each of the terminals 36 is inserted through the connector portion 35 and a seal portion 170 of the base portion 17 and is electrically connected to a corresponding one of through-holes (not shown) formed at the child circuit board 14.

The connecting conductors 15 of the connector module 12 are members that electrically connect the child circuit board 14 to the parent circuit board 11. In the illustrated example, the surface mount terminals 151 are used as the connecting conductors 15. Two end portions of each surface mount terminal 151 are electrically connected to a wiring pattern (not shown) of the child circuit board 14 and a wiring pattern (not shown) of the parent circuit board 11, respectively. A plurality of spacer members 18 are installed between the parent circuit board 11 and the child circuit board 14 such that a wiring space 22 (see FIG. 3) for wiring the connecting conductors 15 between the circuit boards 11, 14 is ensured by the spacer members 18.

The parent circuit board 11, the child circuit board 14, the connecting conductors 15 and the base portion 17 are covered by the cover 13, so that the control unit 10 is substantially entirely protected from external impact and dust. A lower end portion of the cover 13 is fitted to an outer side of the motor housing 83, and an opening 131 (see FIG. 2), from which the connector portion 35 is exposed, and a seal piece 132, which surrounds the opening 131, are formed at a top portion of the cover 13. The seal piece 132 is in close contact with a seal material 37 placed at the base portion 17 to limit water or moisture from entering the inside of the cover 13 through the opening 131.

In the drive device 1 of the first embodiment which has the above-described structure, the electric power supply and the signals are supplied from the external cable 19 to the parent circuit board 11 located on the electric motor 80 side through the connector portion 35 of the connector module 12, the child circuit board 14 and the connecting conductors 15. Therefore, in a case where the configuration of the opening of the external connector 16, such as the number of the terminals, pitches of the terminals and/or a depth of the opening of the external connector 16, changes, or in a case where a different type of external connector 16, which is different from a previous type of external connector 16, is demanded by an original equipment manufacturer (OEM), a specification change of the external connector 16 can be easily dealt with by changing the connector portion 35 or changing some of the electronic components on the child circuit board 14 without changing the parent circuit board 11.

Further, in the connector module 12 of the present embodiment, since the connector portion 35 is provided with the linear terminals 36, each of which is shaped in the straight linear form, the connector module 12 can be formed with the less number of steps at the lower costs in comparison to the case where each of the terminals is formed by bending a terminal shaped in a plate form and is insert-molded in the connector. Furthermore, since the child circuit board 14 is arranged to overlap with the parent circuit board 11 in the axial direction of the motor axis AX, the control unit 10 can be compactly configured with a diameter that is substantially the same as the diameter of the electric motor 80, and a large number of the circuit elements 141 can be arranged at both of the circuit boards 11, 14.

Particularly, since the filter circuit, the communication circuit and the calculation circuit are formed on the child circuit board 14 by the circuit elements 141, the noises can be filtered at the location closer to the external cable 19 than the parent circuit board 11, and thereby the high-precision communication can be performed. Thus, the current value of the electric current to be supplied to the electric motor 80 can be controlled based on the communication with the external device. Furthermore, the child circuit board 14 and the parent circuit board 11 are electrically connected with each other through the connecting conductors 15, and the wiring space 22 for the connecting conductors 15 is mechanically ensured by the spacer members 18. Thus, the robust drive device 1 of the mechanical and electrical integrated type can be constructed.

Second Embodiment

Figure 6:
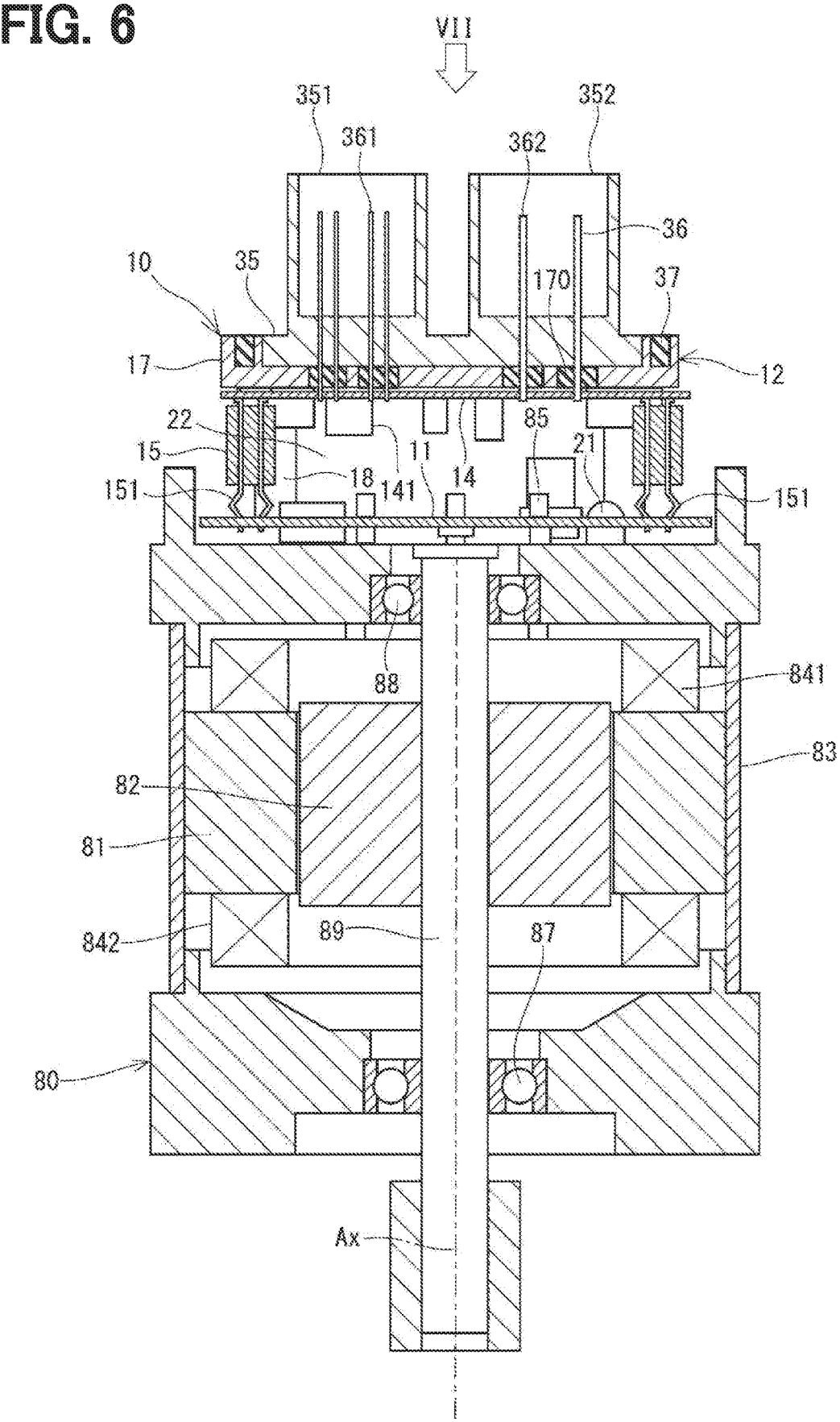
FIG. 6 is a longitudinal cross-sectional view of a drive device of a second embodiment.
Figure 7:
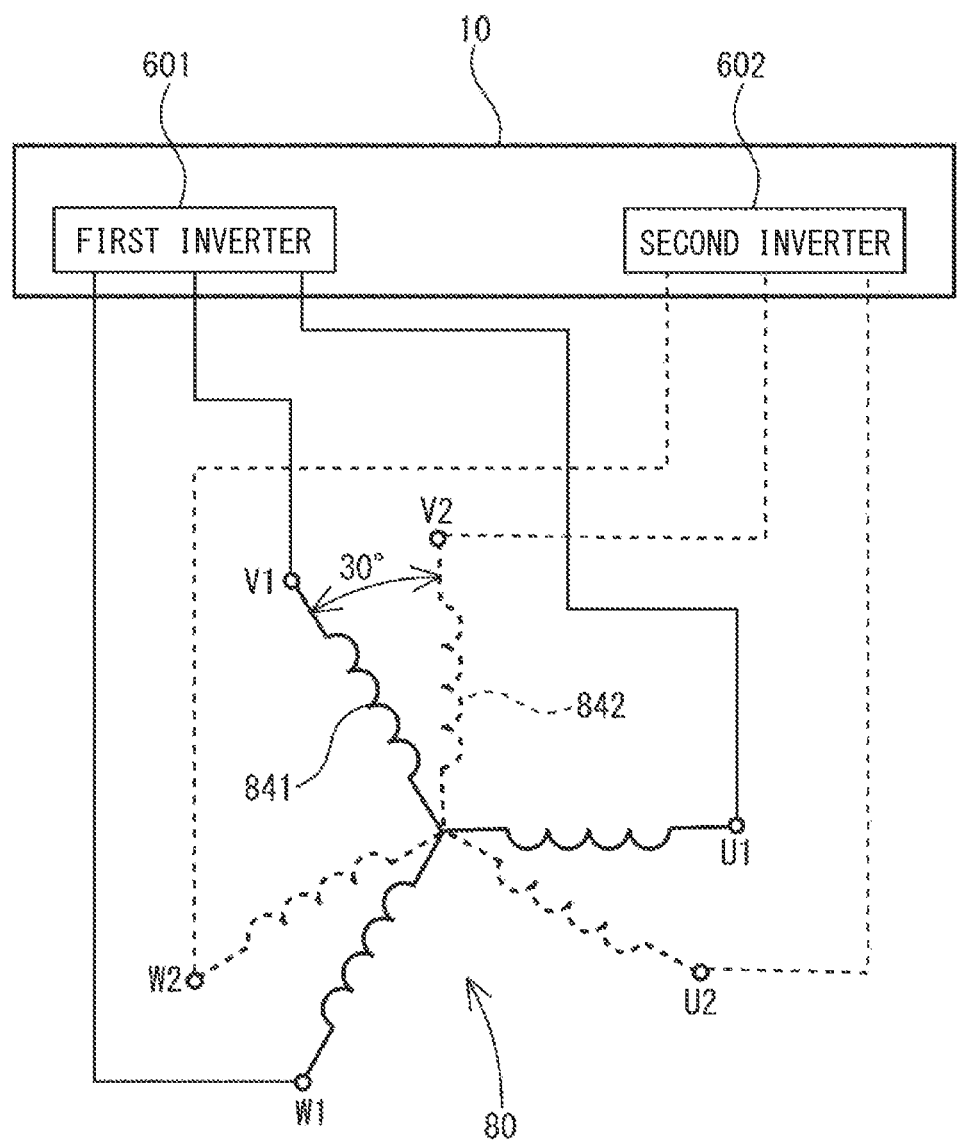
FIG. 7 is a schematic diagram showing a control unit of a three-phase AC motor.

Next, the drive device 1 of the second embodiment will be described with reference to FIGS. 6 to 19B. As shown in FIGS. 6 and 7, the drive device 1 of the second embodiment integrally includes: a three-phase AC brushless motor (hereinafter, referred to as an electric motor) 80, which has a plurality of sets of three-phase windings, more specifically two sets of three-phase windings 841, 842; and the control unit 10 which redundantly controls the electric motor 80 by using the electric power supply and the signals supplied from the external cable (not shown) for each of the two systems. The two sets of windings 841, 842 of the electric motor 80 have the same electrical characteristics and are wound around the stator 81 while the electric angle of the one set of windings 841 is shifted by 30 degrees relative to the other set of windings 842. Inverters (first and second inverters) 601, 602, which individually control the energization of the corresponding one of the two sets of windings 841, 842, are installed to the parent circuit board 11 of the control unit 10.

In addition to the parent circuit board 11, the control unit 10 includes: a connector module 12, which connects a plurality of external connectors (more specifically a pair of external connectors) 161, 162 (see FIG. 9) to a parent circuit board 11; and a cover 13. The connector module 12 has the base portion 17, the connector portion 35, the child circuit board (serving as the wiring module) 14, a plurality of connecting conductors 15, a plurality of spacer members 18 and a lock lever 120 (see FIG. 16). The connector portion 35 includes a first connector portion 351, which is configured to be coupled with and decoupled from the external connector 161 of the first system L1; and a second connector portion 352, which is configured to be coupled with and decoupled from the external connector 162 of the second system L2. The single lock lever (serving as a single lock member) 120 is configured to collectively lock or release the external connectors 161, 162 relative to the connector portions 351, 352.

Figure 8:
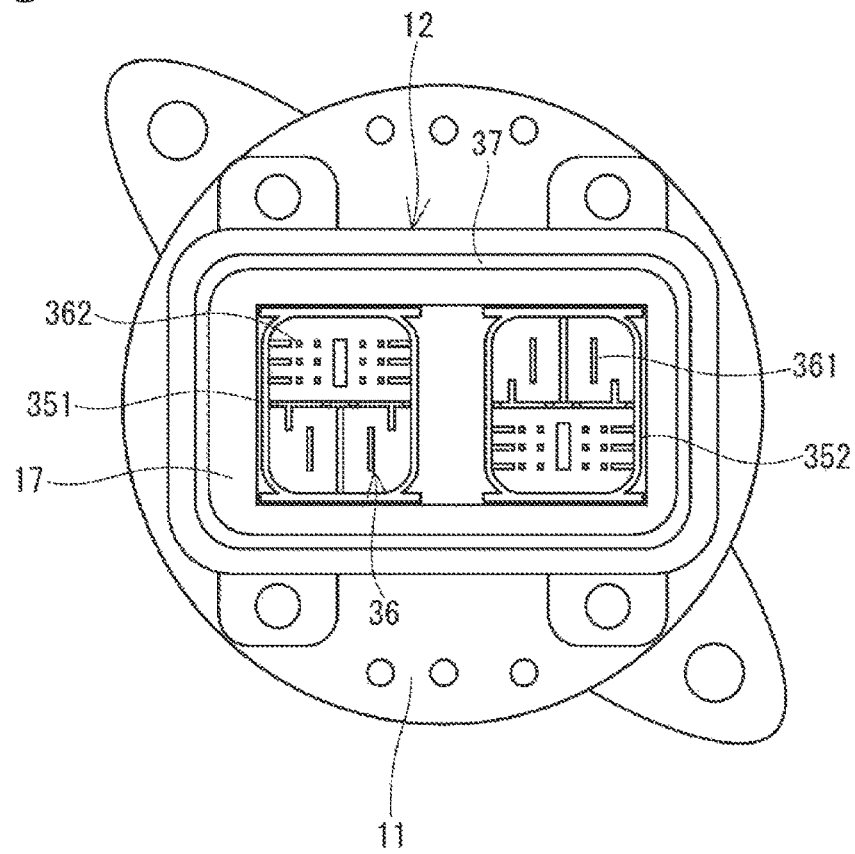
FIG. 8 is a view taken in a direction of an arrow VIII in FIG. 6, showing a connector module.
Figure 9:
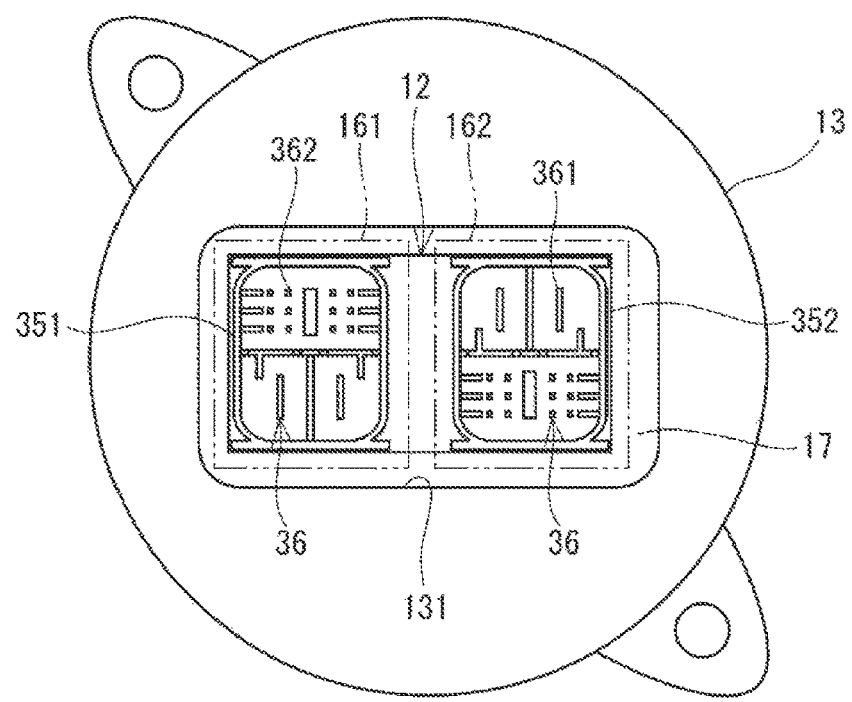
FIG. 9 is a view corresponding to FIG. 8 showing a state in which the connector module is covered with a cover.
Figure 10:
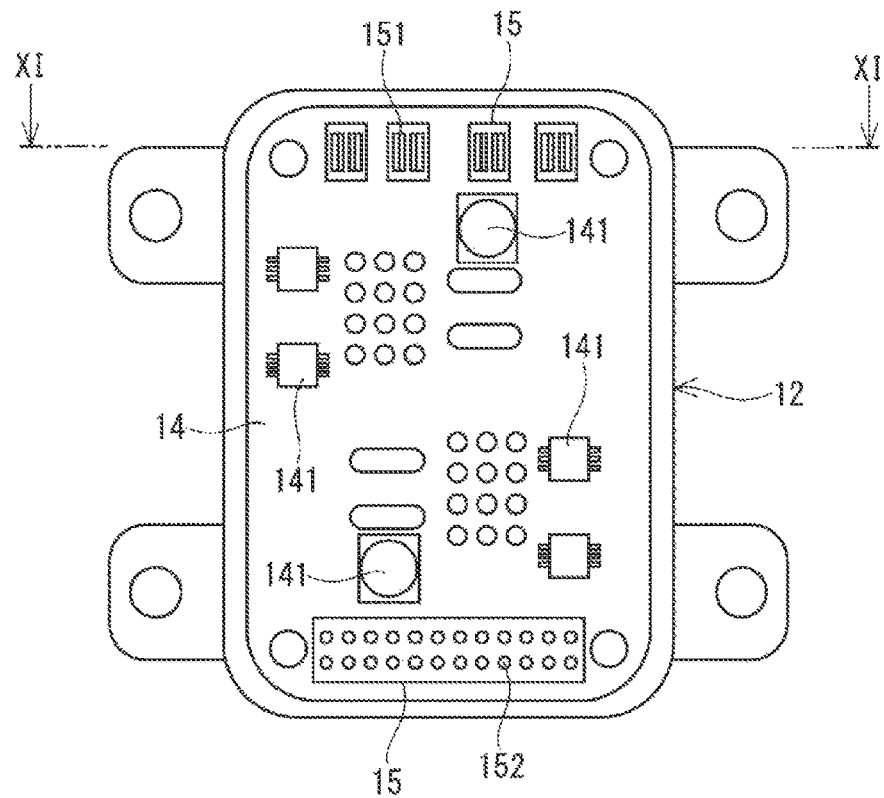
FIG. 10 is a bottom view of the connector module.
Figure 11:
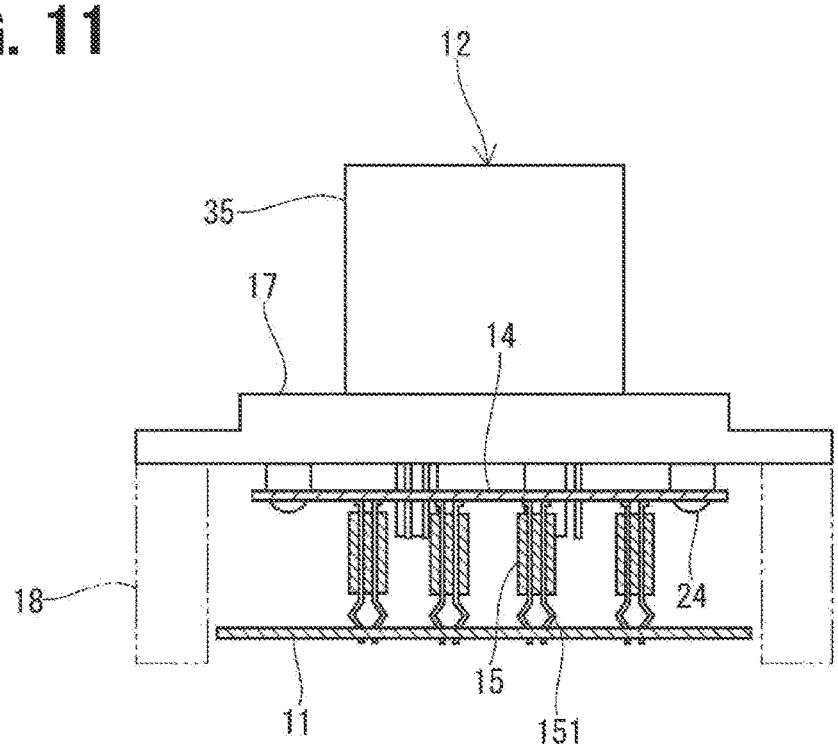
FIG. 11 is a cross-sectional view taken along line XI-XI in FIG. 10.
Figure 12A:
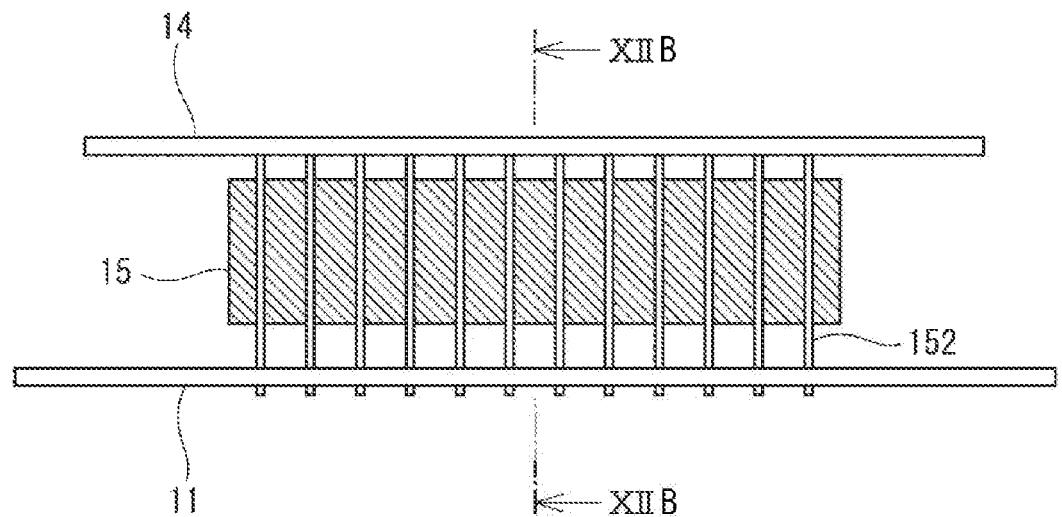
FIG. 12A is a cross-sectional view showing power supply surface mount terminals.
Figure 12B:
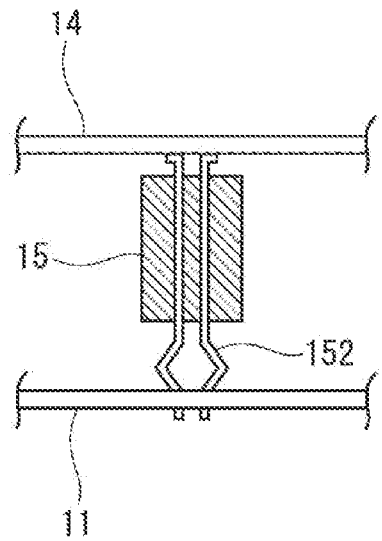
FIG. 12B is a cross-sectional view taken along line XIIb-XIIb in FIG. 12A.

As shown in FIGS. 6, 8 and 9, each of the connector portions 351, 352 has a plurality of terminals 36 which individually connect the corresponding one of the external connectors 161, 162 to the child circuit board 14. Like in the first embodiment, the terminals 36 include a plurality of electric power supply terminals 361 and a plurality of signal terminals 362 which are respectively shaped in the straight linear form that extends linearly in parallel with the motor axis.

As shown in FIGS. 10, 11, 12A and 12B, the plurality of connecting conductors 15 are interposed between the child circuit board 14 and the parent circuit board 11. In the second embodiment, a plurality of electric power supply surface mount terminals 151, which are configured to supply the electric power supply of the two systems from the child circuit board 14 to the parent circuit board 11, and a plurality of signal surface mount terminals 152, which are configured to supply the signals of the two systems from the child circuit board 14 to the parent circuit board 11, are used as the connecting conductors 15. One end portion of each of the surface mount terminals 151, 152 is connected to the child circuit board 14, and the other end portion of each of the surface mount terminals 151, 152 is connected to the parent circuit board 11. The wiring space 22 for the connecting conductors 15 is ensured between the child circuit board 14 and the parent circuit board 11 by the spacer members 18 (see FIG. 6).

Figure 13A:
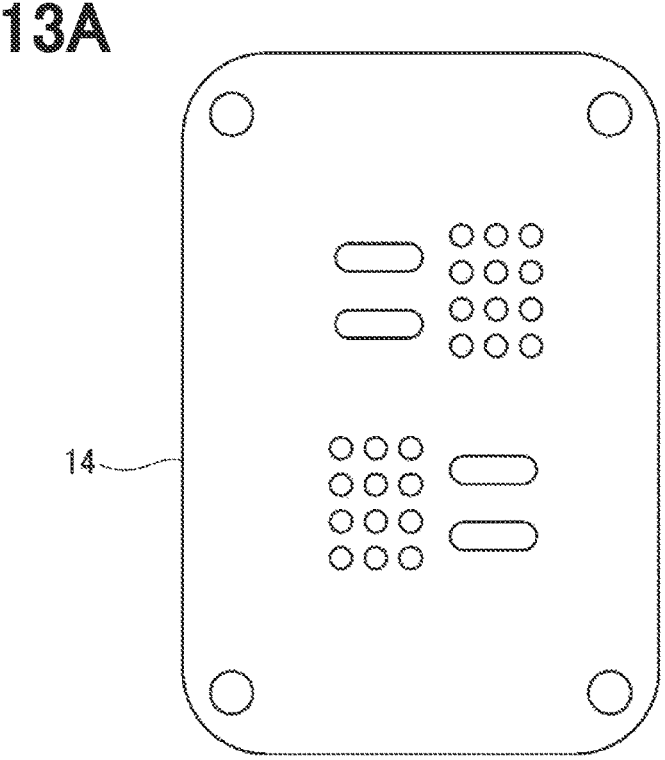
FIG. 13A is a top view showing a connector-side surface of a child circuit board.
Figure 13B:
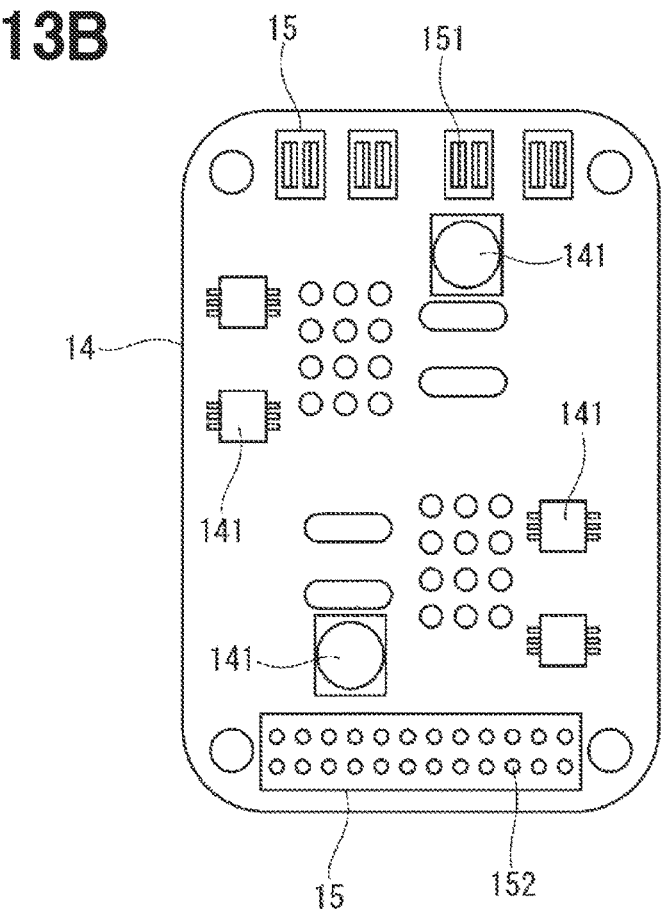
FIG. 13B is a bottom view showing a parent circuit board side surface of the child circuit board.

The child circuit board 14 is a single-sided reflow circuit board (i.e., a reflow circuit board that is single sided). As shown in FIG. 13A, none of the circuit elements is installed to the rear side surface (the upper surface in FIG. 6) of the child circuit board 14. As shown in FIG. 13B, a plurality of circuit elements 141 are installed on the front side surface (the lower surface in FIG. 6) of the child circuit board 14 at two regions which are assigned to the first system and the second system, respectively, while each of the two regions has the same combination of the circuit elements 141. The filter circuit, the communication circuit and the calculation circuit, which are similar to those of the first embodiment, are formed at each of the two regions of the child circuit board 14 by the corresponding circuit elements 141.

Figure 14:
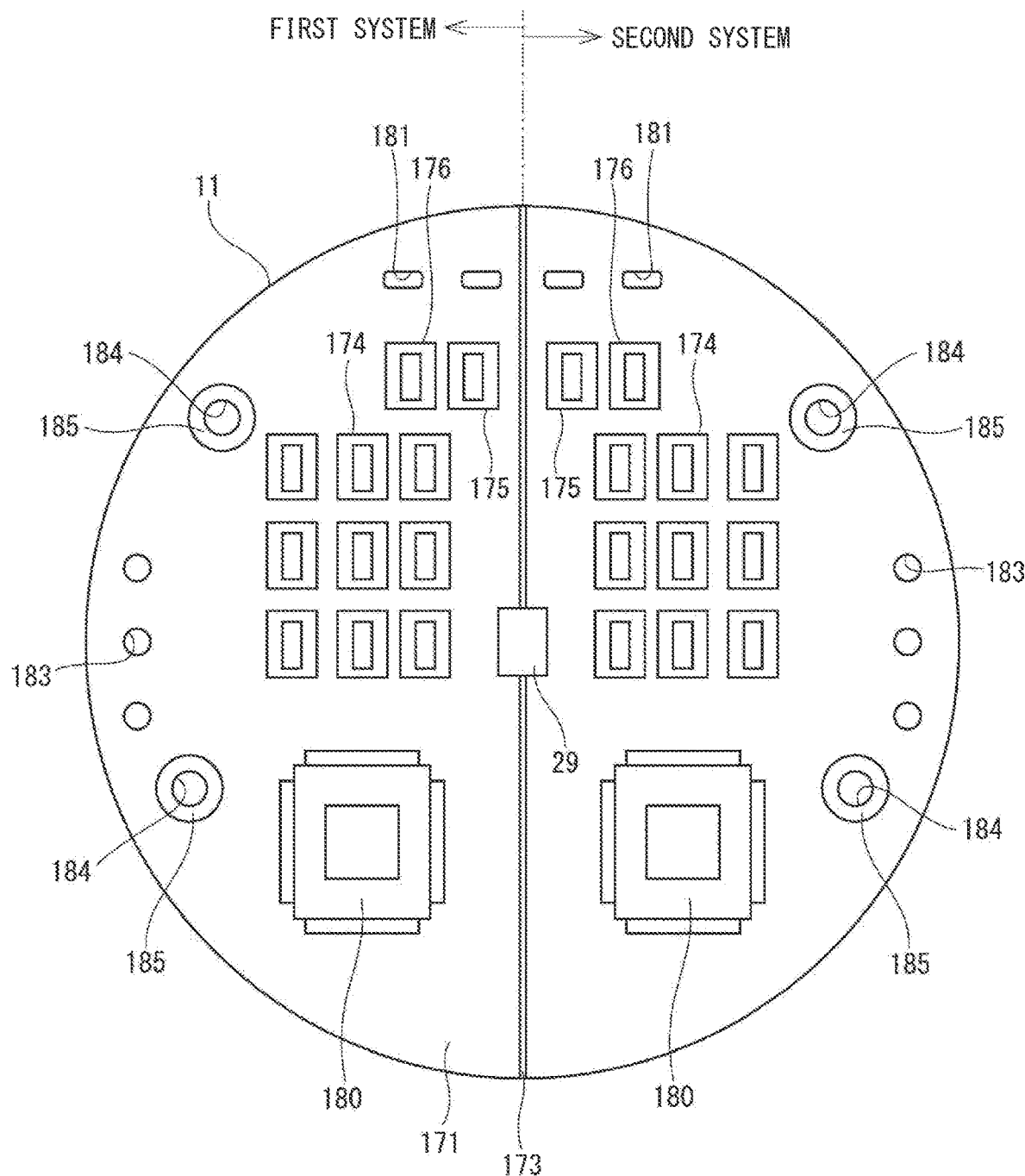
FIG. 14 is a bottom view showing a motor side surface of the parent circuit board.
Figure 15:
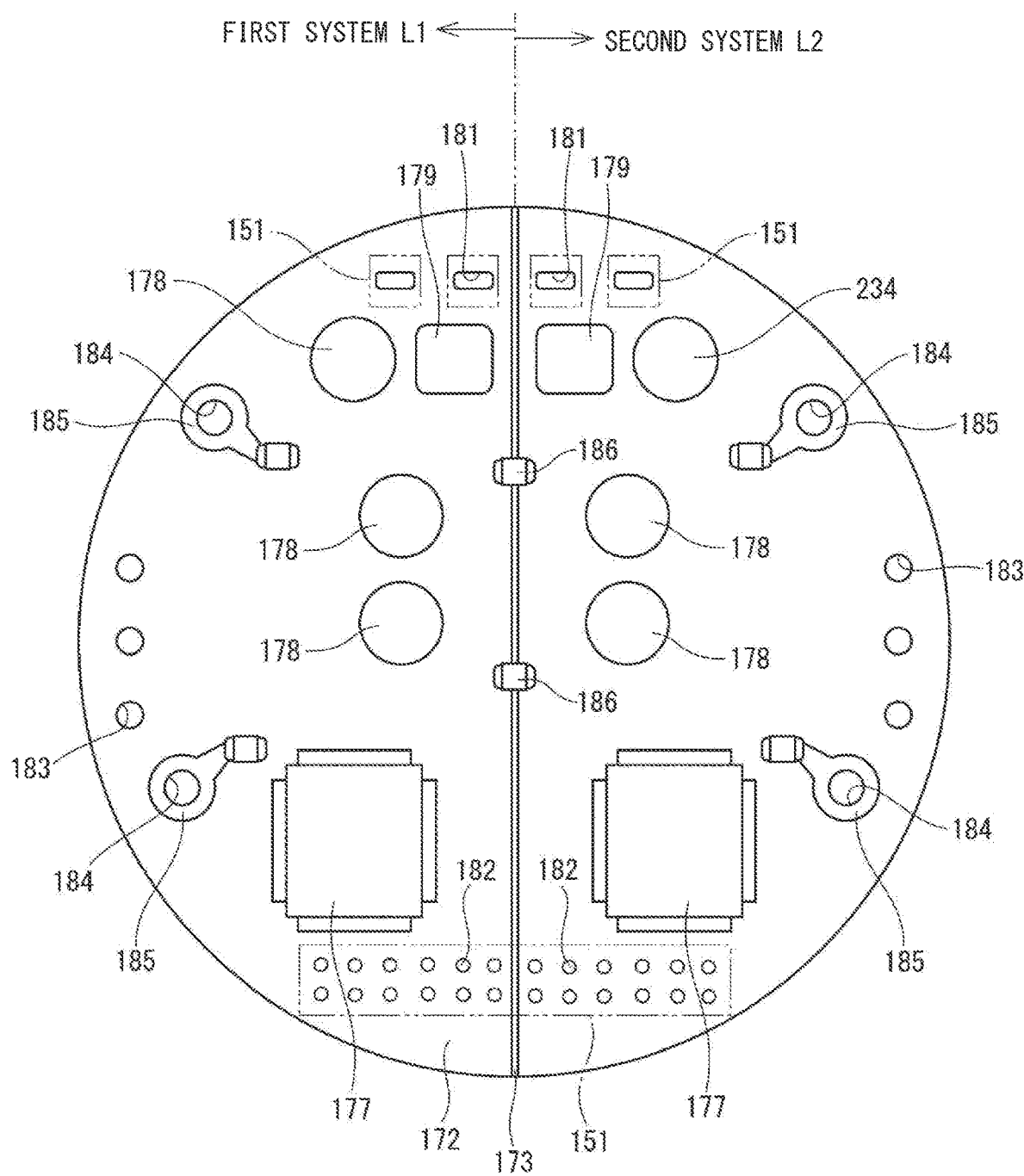
FIG. 15 is a top view showing a child circuit board side surface of the parent circuit board.

FIGS. 14 and 15 show the component arrangement on the parent circuit board 11. Specifically, FIG. 14 shows a front side surface 171 of the parent circuit board 11, and FIG. 15 shows a rear side surface 172 of the parent circuit board 11. The parent circuit board 11 is electrically separated into two segments by a slit 173. The electronic components of the first system are installed to the front side surface 171 and the rear side surface 172 of one of the two segments of the parent circuit board 11, and the electronic components of the second system are installed to the front side surface 171 and the rear side surface 172 of the other one of the two segments of the parent circuit board 11. The electronic components at the front side surface 171 include a plurality of switching devices 174 of the inverters 601, 602 (see FIG. 7), a plurality of motor relays 175, a plurality of electric power supply relays 176, a plurality of microcomputers 180, and the electronic components at the rear side surface 172 include a plurality of capacitors 178, a plurality of coils 179 and a plurality of ICs 177.

A plurality of electric power supply terminal connection holes 181, which are respectively connected with the electric power supply surface mount terminals 151, extend through an outer peripheral portion of the parent circuit board 11, and a plurality of signal terminal connection holes 182, which are respectively connected with the signal surface mount terminals 152, are formed at the rear side surface 172 at a location that is circumferentially displaced by 180 degrees from the electric power supply terminal connection holes 181. Furthermore, two sets of three lead wire connection holes 183, which are connected with the lead wires 85 of the two systems of the electric motor 80, extend through the outer peripheral portion of the parent circuit board 11 such that the one set of the three lead wire connection holes 183 are circumferentially displaced by 180 degrees from the other set of the three lead wire connection holes 183. Also, a plurality of bolt-insertion holes 184 are arranged adjacent to each set of the three lead wire connection holes 183 at the outer peripheral portion of the parent circuit board 11.

The parent circuit board 11 is installed to the motor housing 83 of the electric motor 80 by fixation screws 21 that are respectively inserted through the bolt-insertion holes 184 (see FIG. 6). A connection pattern 185, which is shaped in a circular ring form, is formed around each of the bolt-insertion holes 184. Each of the connection patterns 185 is electrically connected to the motor housing 83 through contact of the connection pattern 185 with the corresponding fixation screw 21, so that the motor housing 83 is electrically connected to a vehicle body grounding portion. Inter-system ground connection capacitors 186 are installed to the rear side surface 172 of the parent circuit board 11 such that the inter-system ground connection capacitors 186 are placed across the slit 173, and the rotational angle sensor 29 is placed at the center of the front side surface 171 of the parent circuit board 11.

Figure 16:
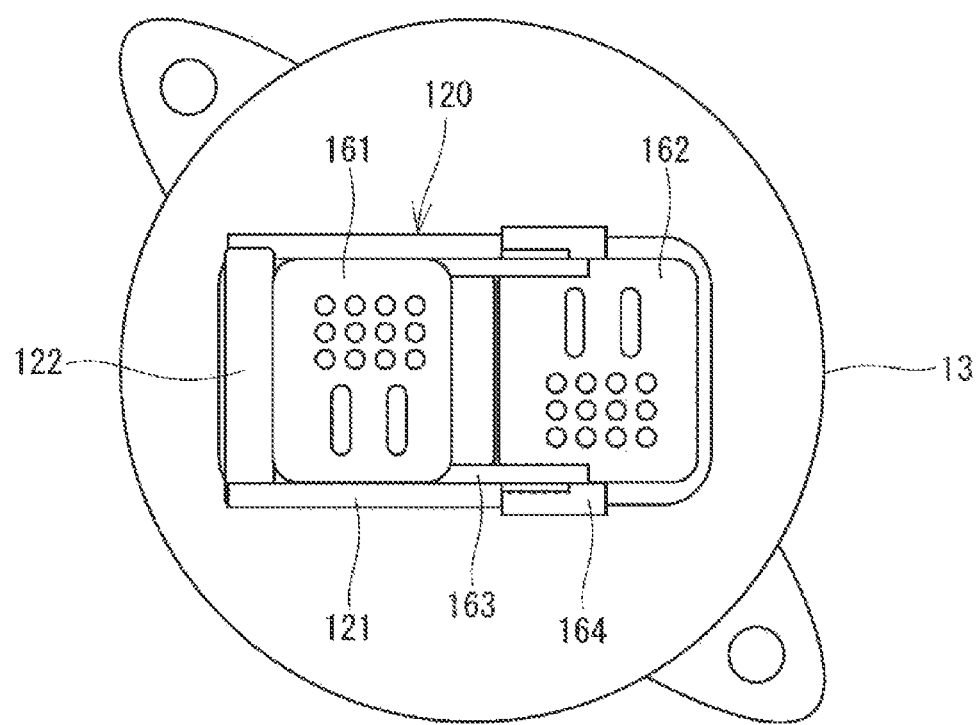
FIG. 16 is a top view showing a connector module to which external connectors are connected.
Figure 17:
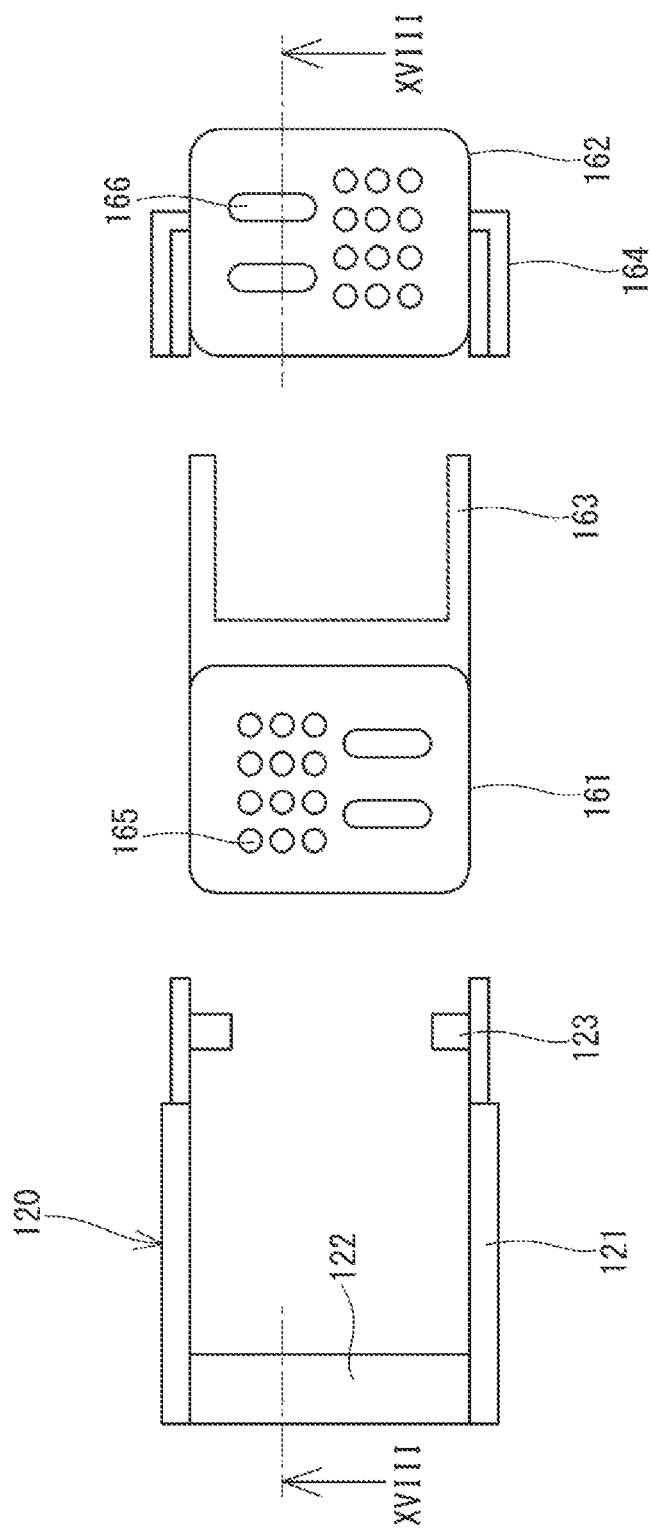
FIG. 17 is an exploded view of the external connectors and a lock lever.
Figure 18:
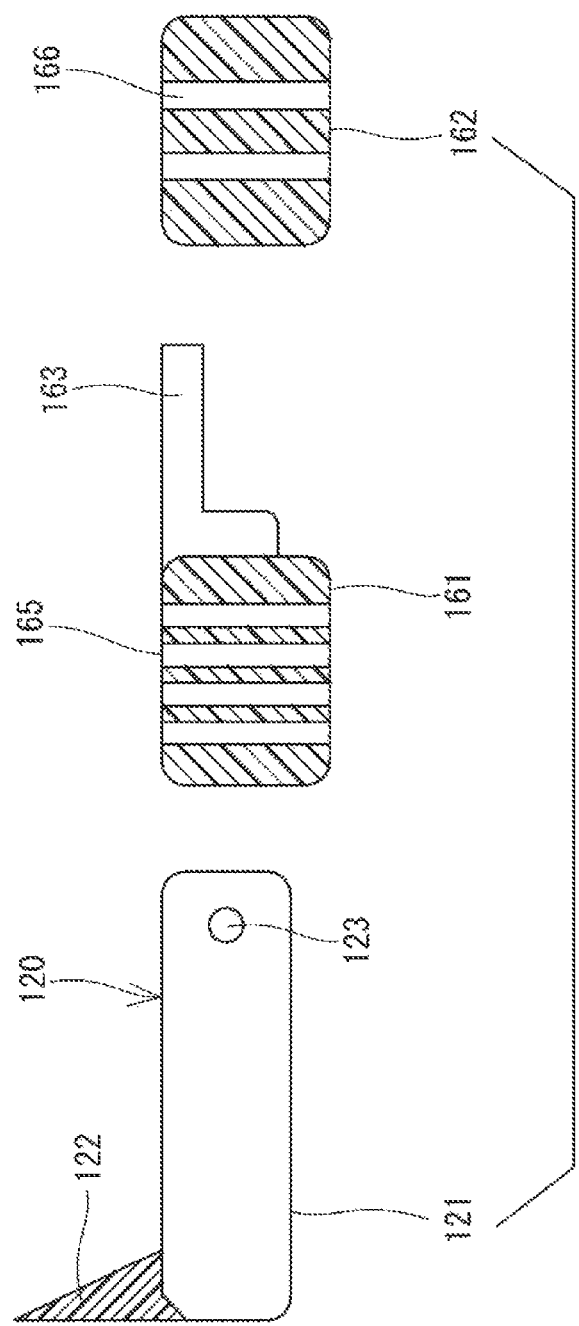
FIG. 18 is a cross-sectional view taken along line XVIII-XVIII n FIG. 17.

FIG. 16 shows a state where the external connectors 161, 162 of the two systems are locked to the pair of connector portions (not shown) by the lock lever 120. As shown in FIGS. 17 and 18, the lock lever 120 has a pair of arm portions 121, which are coupled with the external connectors 161, 162, and a handle portion 122, which is configured to be manipulated to rotate the lock lever 120. The arm portions 121 and the handle portion 122 are formed integrally in one-piece. A boss portion 123 projects from an inner surface of each of the arm portions 121. The boss portions 123 are fitted into hook grooves (serving as support portions) 137 (see FIG. 19A) of the connector portion 35. The external connectors 161, 162 respectively have connecting portions 163, 164 which are coupled together through the boss portions 123. Also, each of the external connectors 161, 162 has a plurality of terminal holes 165, 166, through which the terminals 36 of the corresponding one of the connector portions 351, 352 are inserted.

Figure 19A:
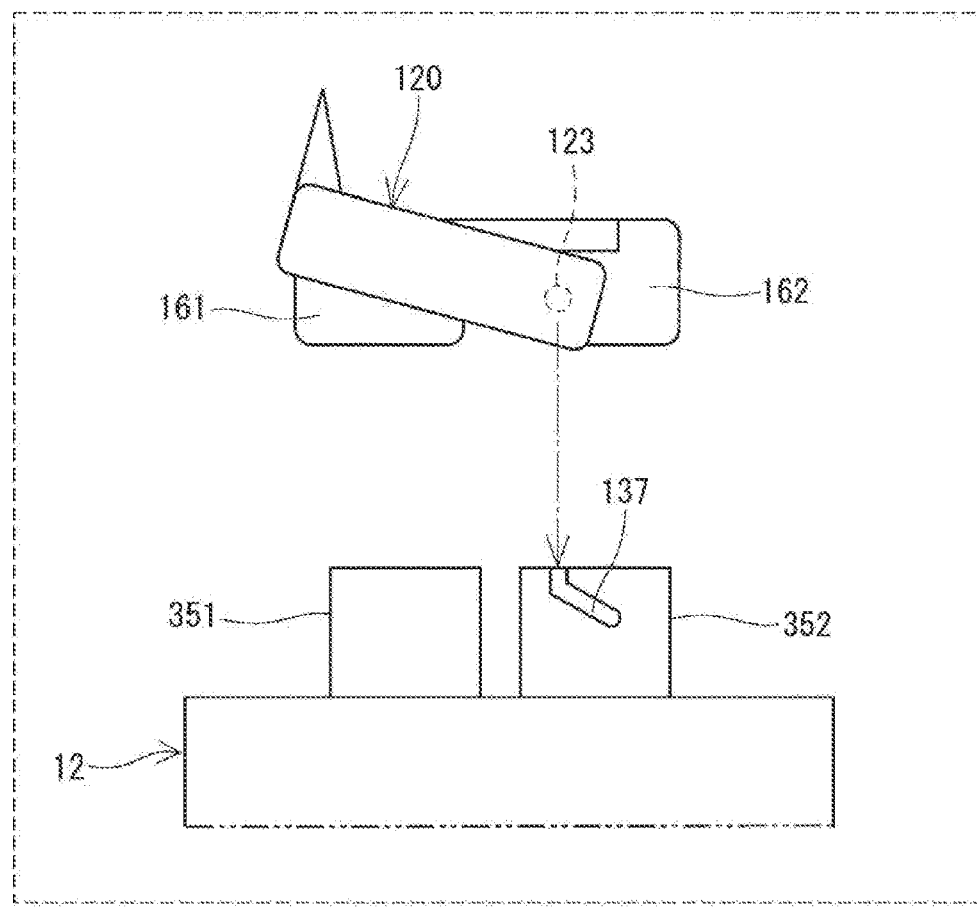
FIG. 19A is a schematic diagram showing an operation of inserting the external connectors into connector portions.
Figure 19B:
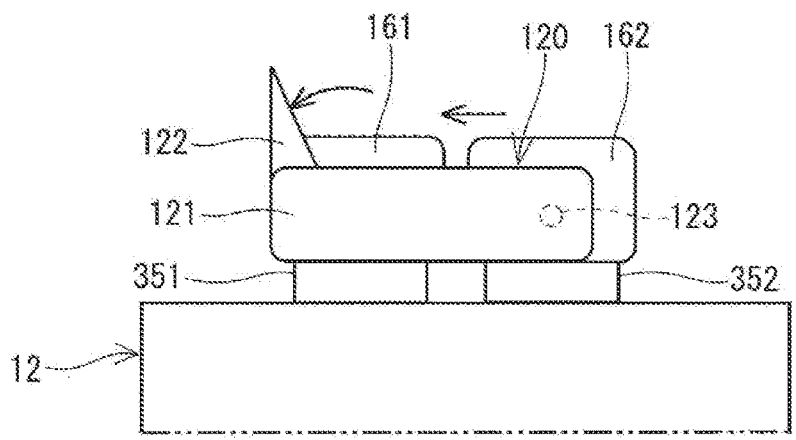
FIG. 19B is a schematic diagram showing an operation of the lock lever.

At the time of connecting the external connectors 161, 162 to the connector portions 351, 352, the two external connectors 161, 162 are combined and are coupled together by the lock lever 120, as shown in FIG. 19A. Next, the external connectors 161, 162 are respectively inserted to the connector portions 351, 352, and the boss portions 123 of the lock lever 120 are engaged to the hook grooves 137 of the connector portion 352. In this state, as shown in FIG. 19B, the lock lever 120 is rotated downward, and thereby the external connectors 161, 162 are fixed to the connector portions 351, 352.

Thus, in the drive device 1 of the second embodiment, the electric power supply and the signals of the two systems can be supplied to the child circuit board 14 through the pair of connector portions 351, 352 and can be thereafter supplied to the parent circuit board 11 through the child circuit board 14. At the time of connecting the external connectors 161, 162 to the connector portions 351, 352, the external connectors 161, 162 can be collectively and securely connected to the connector portions 351, 352 by using the lock lever 120 in a simple manner. Furthermore, the hook grooves (serving as the support portions) 137 of the lock lever 120 are formed only at the connector portion 352 among the two connector portions 351, 352, so that it is possible to limit erroneous assembly, and the lock lever 120 can be correctly operated. The other effects and advantages of the present embodiment are the same as those of the first embodiment.

Third Embodiment

Figure 20:
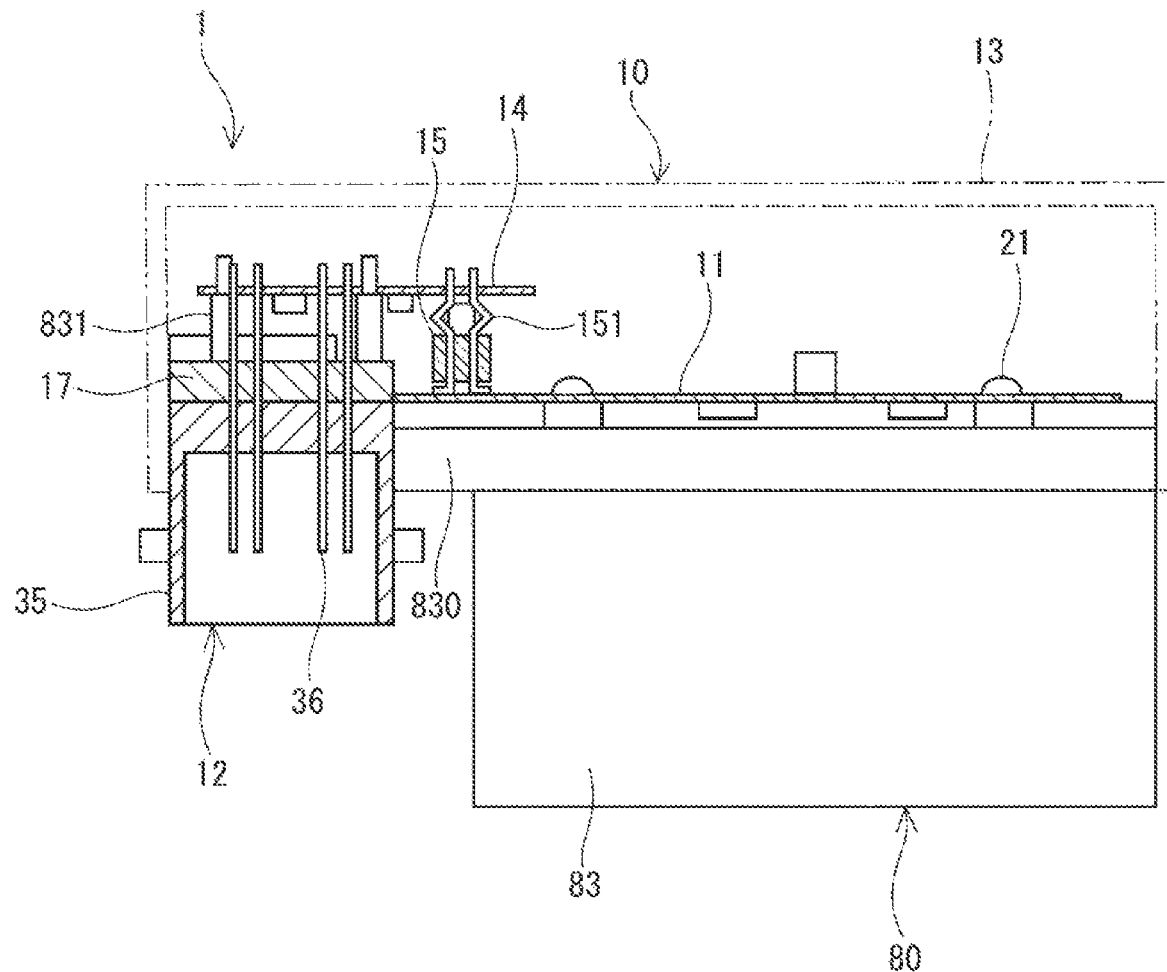
FIG. 20 is a partially fragmented front view of a drive device of a third embodiment.

Next, the drive device 1 of the third embodiment will be described with reference to FIGS. 20, 21 and 22. In the drive device 1 of the third embodiment, as shown in FIG. 20, the connector module 12 of the control unit 10 is located on a lateral side of the electric motor 80 and is installed to an overhanging portion 830 of the motor housing 83. The child circuit board 14 is located on the rear side (the upper side in FIG. 16) of the connector module 12 and is held by a plurality of support columns 831 of the base portion 17. The cover 13, which protects the child circuit board 14 and the parent circuit board 11, is installed to the motor housing 83.

The connector portion 35 is located on the front side surface of the base portion 17 such that the terminals 36 are directed toward the front side. Like in the first embodiment described above, each of the terminals 36 is shaped in the straight linear form such that a proximal end portion of the terminal 36 extends through the connector portion 35 and the base portion 17 and is connected to the child circuit board 14, and a distal end portion of the terminal 36 is configured to be coupled with and decoupled from the external connector (not shown). The parent circuit board 11 of the control unit 10 is installed to the motor housing 83 by the fixation screws 21 in a state where a portion of the parent circuit board 11 overlaps with the child circuit board 14, and the parent circuit board 11 is electrically connected to the child circuit board 14 through the connecting conductors 15 formed by the surface mount terminals 151.

Figure 21:
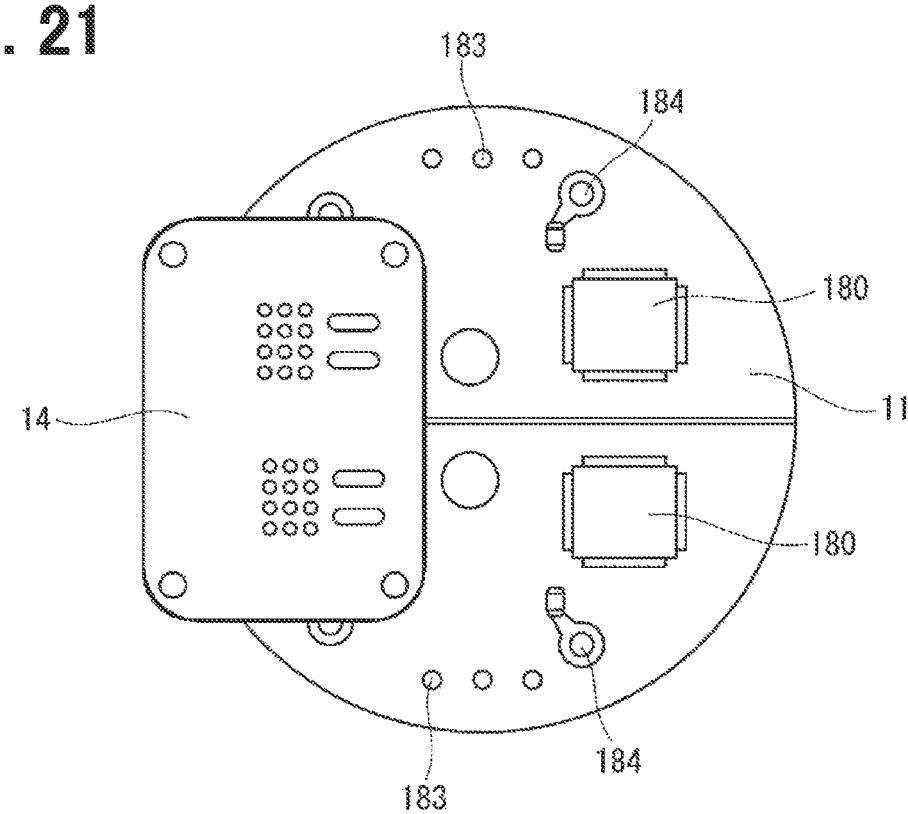
FIG. 21 is a top view of FIG. 20, showing an arrangement of a parent circuit board and a child circuit board.
Figure 22:
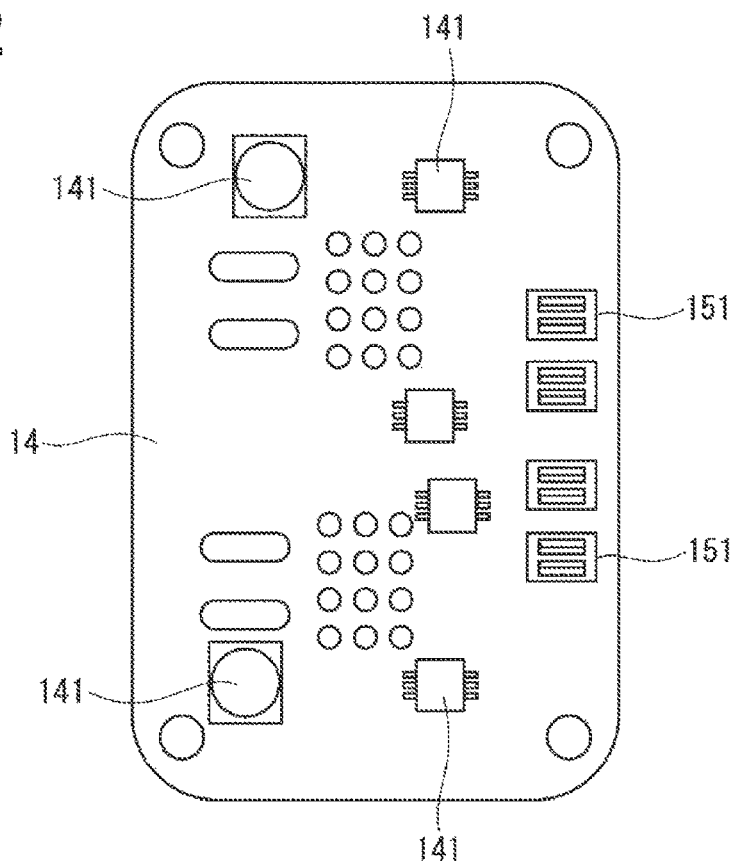
FIG. 22 is a bottom view showing an arrangement of components on the child circuit board.

As shown in FIG. 21, like in the second embodiment, the microcomputers 180, the lead wire connection holes 183 and the bolt-insertion holes 184 are provided to the rear side surface of the parent circuit board 11. The child circuit board 14 is the single-sided reflow circuit board, and none of the circuit elements is installed to the rear side surface of the child circuit board 14. As shown in FIG. 22, the filter circuit, the communication circuit and the calculation circuit 143 are formed by the circuit elements 141 at the front side surface of the child circuit board 14 which is opposed to the parent circuit board 11.

In the drive device 1 of the third embodiment, since the connector module 12 is placed on the lateral side of the electric motor 80, the external connector can be connected to the connector portion 35 from the output side of the electric motor 80. The other effects and advantages of the present embodiment are the same as those of the second embodiment.

Fourth Embodiment

Figure 23:
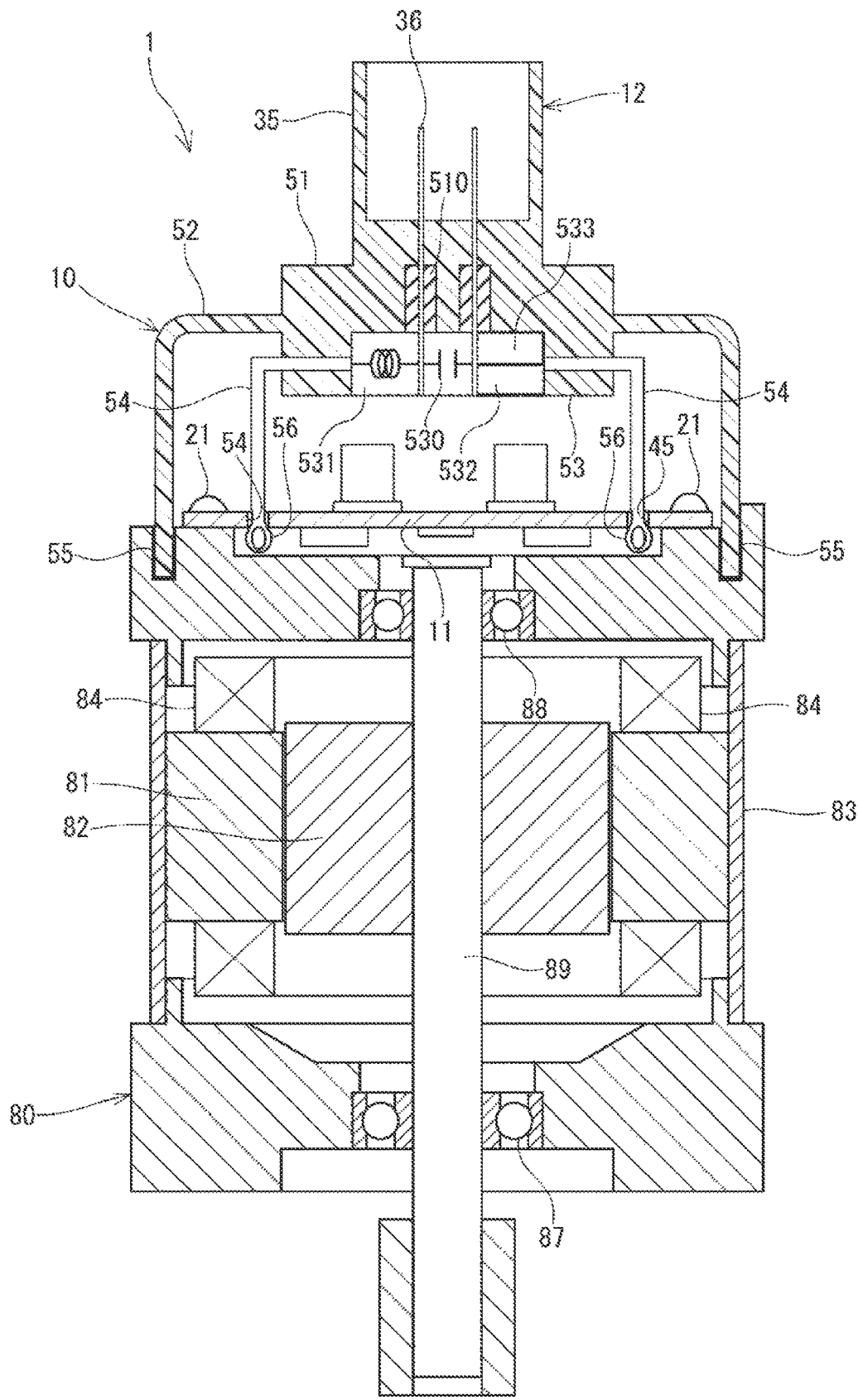
FIG. 23 is a longitudinal cross-sectional view of a drive device of a fourth embodiment.

FIG. 23 shows the fourth embodiment. The drive device 1 of the fourth embodiment differs from each of the above-described embodiments with respect to the structure of the connector module 12. The connector module 12 of the fourth embodiment is formed such that the connector portion 35, a cover portion 52, a component carrier 53 and a plurality of press-fit terminals 54 are integrally formed with a connector case 51 that is made of a dielectric material. A plurality of terminals 36, which include a plurality of electric power supply terminals and a plurality of signal terminals to be connected with the external connector, are provided at the connector portion 35. The cover portion 52 is shaped in a cup form that is sized to cover the parent circuit board 11, and an opening end of the cover portion 52 is in close contact with the motor housing 83 through a seal material 55.

The component carrier 53 is a wiring module that functions in the same manner as the child circuit board 14 of each of the above-described embodiments, and the component carrier 53 is arranged to overlap with the parent circuit board 11 in the axial direction of the motor axis AX. A filter circuit 531 for removing (filtering) a noise, a communication circuit 532 for communication with the vehicle ECU 99 and a calculation circuit 533 for calculating an electric current command value of the electric current to be supplied to the electric motor 80 based on the communication with the vehicle ECU 99 are formed by a plurality of circuit elements 530 (FIG. 23 shows representative circuit elements among the plurality of circuit elements 530) at an inside of the component carrier 53. Each of the linear terminals 36 of the connector portion 35 extends through the seal portion 510 of the connector case 51 and is connected to the corresponding circuit element 530 to receive the electric power supply and the signals from the external cable (not shown).

The press-fit terminals 54 are connecting conductors for electrically connecting the component carrier 53 to the parent circuit board 11, and a proximal end portion of each of the press-fit terminals 54 is buried in the constituent material of the connector case 51 by insert-molding. A press-fitting portion 56, which has a relatively large diameter, is formed at a distal end portion of each of the press-fit terminals 54. The press-fitting portions 56 are respectively press-fitted into engaging holes 45 of the parent circuit board 11, so that the entire connector module 12 is assembled to the electric motor 80. Therefore, according to the drive device 1 of the fourth embodiment, the connector module 12, which is formed by the plurality of components, can be integrally formed and can be assembled to the electric motor 80 with one-touch.

Furthermore, since the component carrier 53 has the filter circuit 531, the communication circuit 532 and the calculation circuit 533, the noises can be filtered on the external device side of the parent circuit board 11, and the electric current command value of the electric current to be supplied to the electric motor 80 can be commanded based on the communication with the external device. Particularly, by communicating with the vehicle ECU 99, for example, the control of the assist torque at the electric power steering system 90 can cooperate with the suspension control or the brake control of the vehicle. Therefore, the functionality and versatility of the control unit 10 can be enhanced without changing the parent circuit board 11.

Other Embodiments

The present disclosure is not limited to each of the above-described embodiments, and for example, as illustrated below, it is possible to appropriately change the shape and the configuration of each component without departing from the spirit of the present disclosure.

Figure 24:
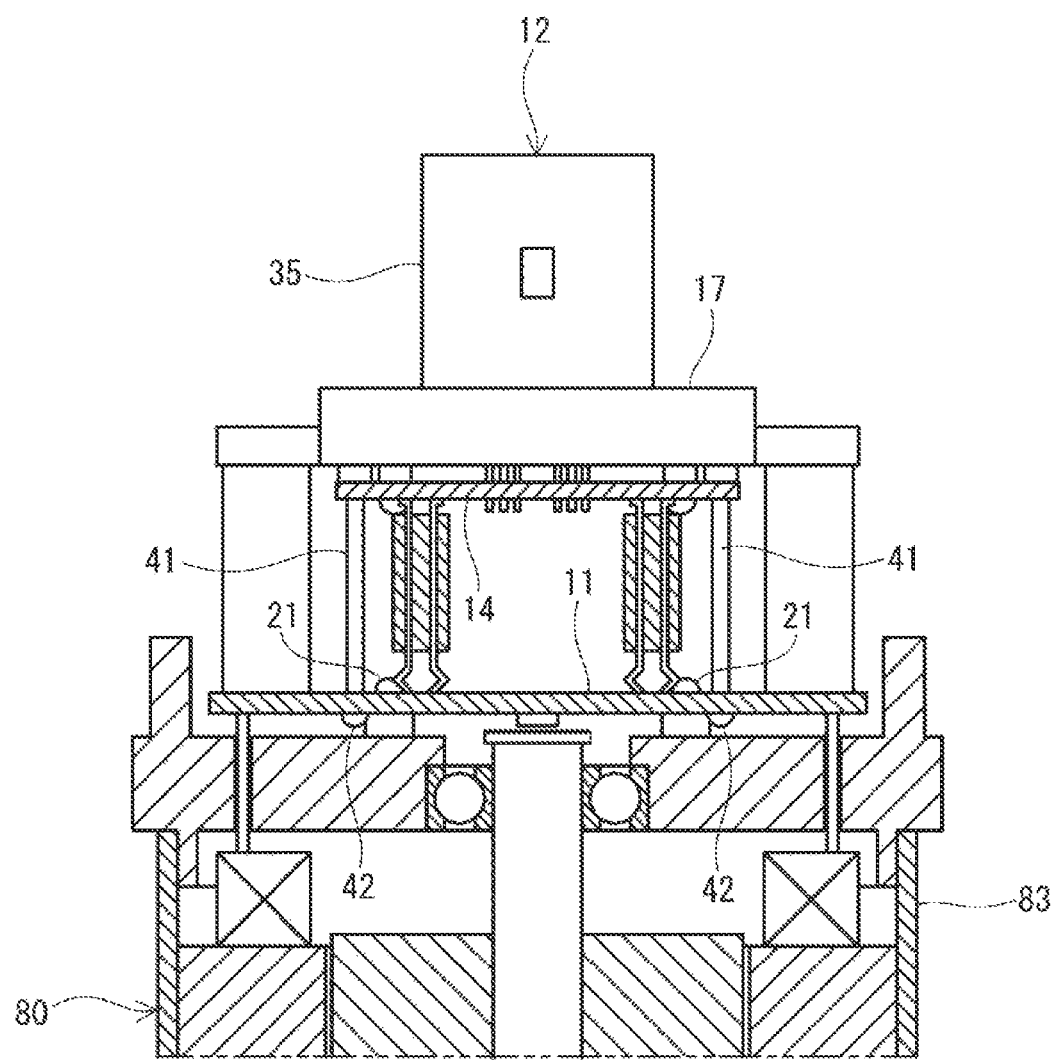
FIG. 24 is a cross-sectional view showing a connector module assembling structure according to another embodiment.

(1) In the embodiment shown in FIG. 2, the connector module 12 is assembled to the electric motor 80 by the assembly bolts 20. However, the way of assembling the connector module 12 to the electric motor 80 is not limited to any particular one. For example, in the embodiment shown in FIG. 24, a plurality of assembly pins 41 project from the base portion 17, and a swaging portion 42, which is formed at a front end of each of the assembly pins 41, is thermally swaged (i.e., plastically deformed upon application of heat) against the parent circuit board 11 and is thereby fixed to the parent circuit board 11, and the parent circuit board 11 is installed to the motor housing 83 by the fixation screws 21.

Figure 25:
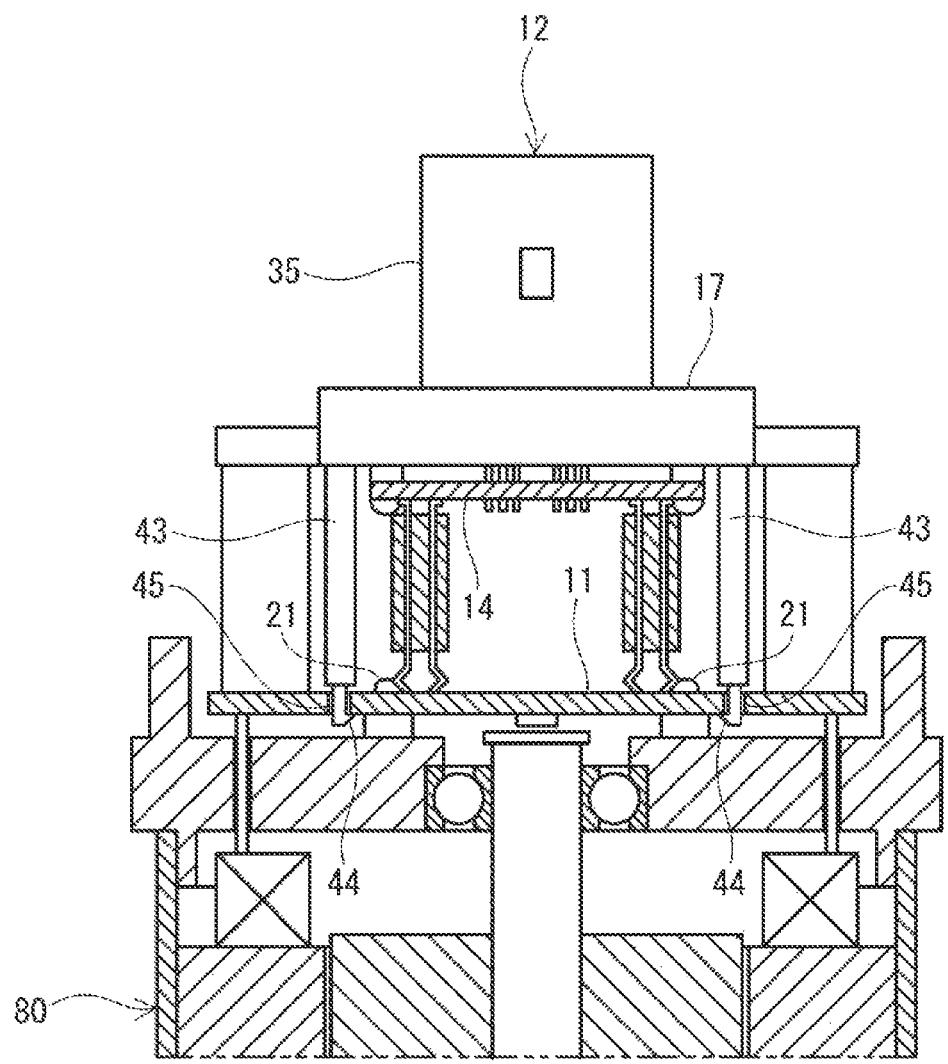
FIG. 25 is a cross-sectional view showing a connector module assembling structure according to a further embodiment.

(2) In the embodiment shown in FIG. 25, the connector module 12 is assembled to the parent circuit board 11 by snap-fitting. A plurality of rods 43 project from the base portion 17, and a claw 44, which is formed at a front end of each of the rods 43, is resiliently engaged with a corresponding one of engaging holes 45 of the parent circuit board 11.

Figure 26:
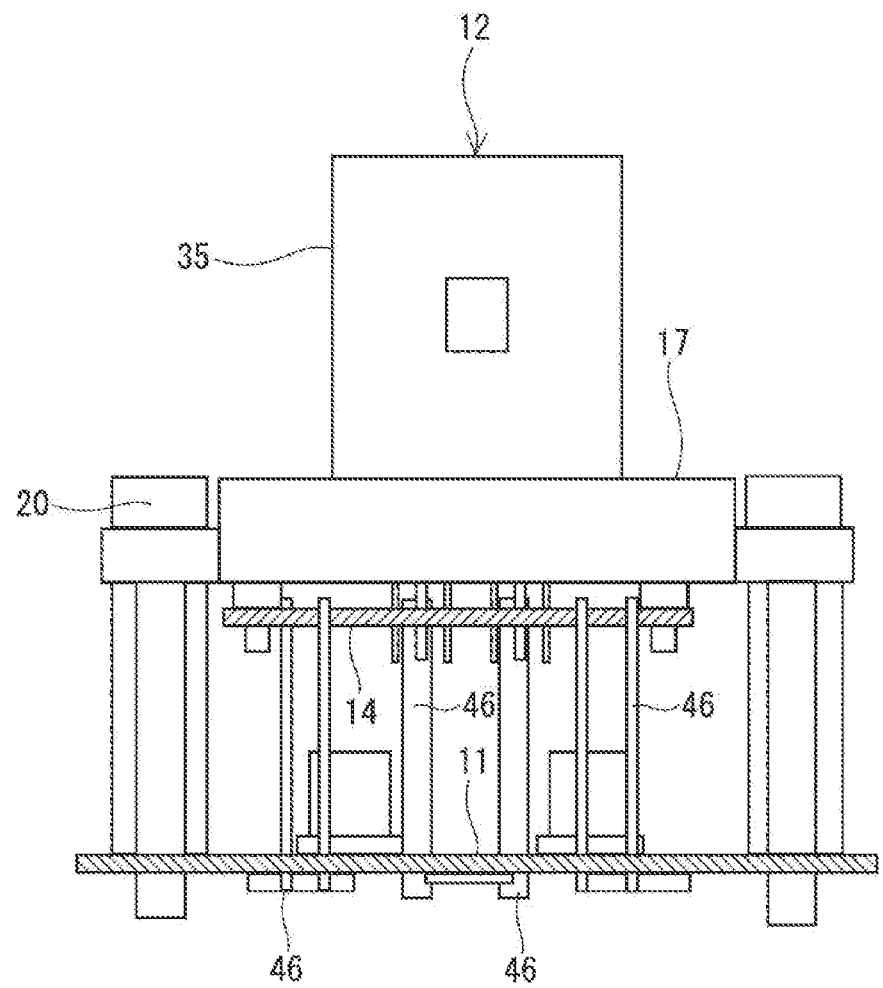
FIG. 26 is an elevation view showing connecting conductors according to another embodiment.

(3) In the embodiment shown in FIG. 2, the surface mount terminals 151 are used as the connecting conductors 15. Alternatively, bus bars may be used in place of the surface mount terminals 151. For example, in the embodiment shown in FIG. 26, a plurality of bus bars 46 are connected to the parent circuit board 11 and the child circuit board 14 in a state where two opposite end portions of each of the bus bars 46 extend through the parent circuit board 11 and the child circuit board 14, respectively.

Figure 27:
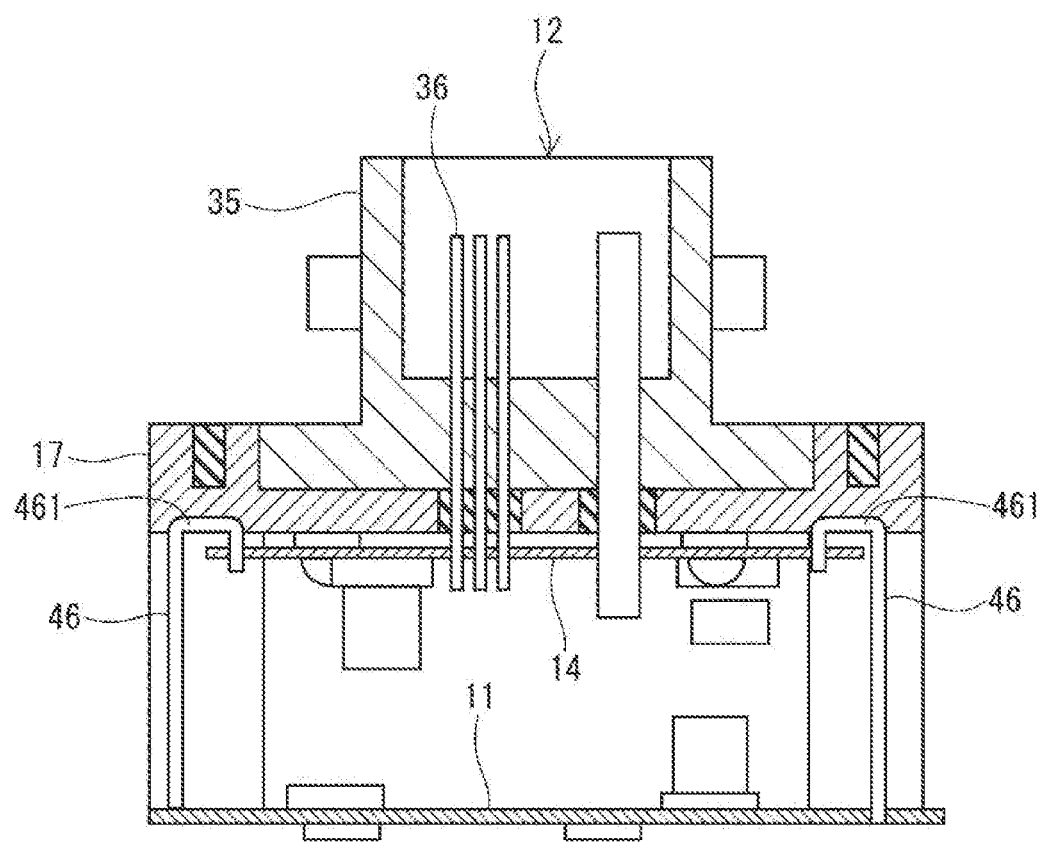
FIG. 27 is a cross-sectional view showing connecting conductors according to a further embodiment.

(4) In the embodiment shown in FIG. 27, two opposite end portions of each of the bus bars 46 are connected to the parent circuit board 11 and the child circuit board 14, respectively, in a state where a bent portion 461 of each of the bus bars 46 is buried in the base portion 17.

The present disclosure has been described with reference to the embodiments. However, the present disclosure is not limited to the above embodiments and the structures described therein. The present disclosure also includes various variations and variations within the equivalent range. Also, various combinations and forms, as well as other combinations and forms that include only one element, more, or less, are within the scope and ideology of the present disclosure.

What is claimed is:

1. A drive device comprising an electric motor and a control unit which are integrated together, wherein:
   the control unit is configured to control the electric motor by using an electric power supply and a signal supplied through an external cable;
   the control unit includes:
     a parent circuit board, which is installed to the electric motor; and
     a connector module, which is configured to connect the parent circuit board to an external connector of the external cable; and
   the connector module includes:
     a connector portion, which is configured to be coupled with and decoupled from the external connector;
     a wiring module, which is placed adjacent to the connector portion and is positioned on an axial side of the parent circuit board opposite to the electric motor, wherein the wiring module is configured to receive the electric power supply and the signal from the external cable through the connector portion and supply the electric power supply and the signal to the parent circuit board, and wherein the wiring module includes a communication circuit, which is configured to communicate with an external device through the external cable; and
     a plurality of connecting conductors, which electrically connect the wiring module to the parent circuit board, wherein:
   the communication circuit is configured to communicate with the external device through a plurality of signal terminals installed in the wiring module and is configured to process the signal received from the external cable through at least one of the plurality of signal terminals and output the signal after the signal is processed through the communication circuit.

2. The drive device according to claim 1, wherein the wiring module includes a filter circuit, which is configured to remove a noise conducted through the external cable.

3. The drive device according to claim 1, wherein the wiring module is arranged to overlap with at least a portion of the parent circuit board in an axial direction of the electric motor.

4. The drive device according to claim 1, wherein the wiring module is located at a position that is closer to the connector portion than the parent circuit board in an axial direction of the electric motor.

5. The drive device according to claim 1, wherein:
   the connector portion includes a plurality of terminals, each of which is shaped in a straight linear form and is configured to be connected with the external connector; and
   the plurality of terminals extend through the connector portion and are connected to the wiring module.

6. The drive device according to claim 1, wherein the connector module includes a spacer member that is held between the parent circuit board and the wiring module.

7. The drive device according to claim 1, wherein the wiring module is a child circuit board, at which a circuit element is installed.

8. The drive device according to claim 7, wherein the circuit element of the child circuit board is installed at a surface of the child circuit board which is opposed to the parent circuit board.

9. The drive device according to claim 7, wherein each of the plurality of connecting conductors is a surface mount terminal that has two end portions that are coupled to the parent circuit board and the child circuit board, respectively.

10. The drive device according to claim 7, wherein each of the plurality of connecting conductors is a bus bar, a portion of which is buried in a base portion of the connector module.

11. The drive device according to claim 1, wherein the wiring module is a component carrier that has a circuit element installed at an inside of the component carrier.

12. The drive device according to claim 11, wherein the component carrier is formed integrally with a connector case of the connector module in one-piece, and a cover portion, which covers the parent circuit board and the component carrier, is formed integrally with the connector case in one-piece.

13. The drive device according to claim 11, wherein each of the plurality of connecting conductors is a press-fit terminal, which is installed to the component carrier and connects the connector module to the parent circuit board.

14. A drive device comprising a multi-phase alternating current (AC) motor and a control unit which are integrated together, wherein:
   the multi-phase AC motor includes a plurality of sets of windings, and the control unit includes a plurality of inverters, which individually control an electric current conducted through a corresponding one of the plurality of sets of windings;
   the control unit includes:
     a parent circuit board, which is installed to the multi-phase AC motor; and
     a connector module, which is configured to connect the parent circuit board to a plurality of external connectors of an external cable for a plurality of systems; and
   the connector module includes:
     a plurality of connector portions, which are configured to be coupled with and decoupled from the plurality of external connectors, respectively;
     a wiring module, which is configured to receive an electric power supply and a signal from the external cable through the plurality of connector portions;
     a plurality of connecting conductors, which electrically connect the wiring module to the parent circuit board; and
     a single lock member, which is configured to collectively lock or release the plurality of external connectors relative to the plurality of connector portions, respectively.

15. The drive device according to claim 14, wherein:
the plurality of external connectors include a pair of external connectors;
the plurality of connector portions include a pair of connector portions;
the single lock member includes a lock lever that is configured to combine the pair of external connectors; and
a support portion, which rotatably supports the lock lever, is formed at one of the pair of connector portions.

16. The drive device according to claim 1, wherein the drive device is applied to an electric power steering system of a vehicle.

17. A drive device comprising an electric motor and a control unit which are integrated together, wherein:
the control unit is configured to control the electric motor by using an electric power supply and a signal supplied through an external cable;
the control unit includes:
a parent circuit board, which is installed to the electric motor; and a connector module, which is configured to connect the parent circuit board to an external connector of the external cable;
the connector module includes:
a connector portion, which is configured to be coupled with and decoupled from the external connector;
a wiring module, which is configured to receive the electric power supply and the signal from the external cable through the connector portion and supply the electric power supply and the signal to the parent circuit board, wherein the wiring module includes a communication circuit, which is configured to communicate with an external device through the external cable; and
a plurality of connecting conductors, which electrically connect the wiring module to the parent circuit board;
the wiring module is a child circuit board, at which a circuit element is installed; and the circuit element of the child circuit board is installed at a surface of the child circuit board which is opposed to the parent circuit board.

18. The drive device according to claim 17, wherein each of the plurality of connecting conductors is a surface mount terminal that has two end portions that are coupled to the parent circuit board and the child circuit board, respectively.

19. The drive device according to claim 17, wherein each of the plurality of connecting conductors is a bus bar, a portion of which is buried in a base portion of the connector module.

* * * * *